United States Patent
Matsumoto et al.

(10) Patent No.: US 10,730,262 B2
(45) Date of Patent: Aug. 4, 2020

(54) HONEYCOMB STRUCTURE AND SANDWICH STRUCTURE, AND BASE MATERIAL FOR HONEYCOMB FOR PRODUCING HONEYCOMB STRUCTURE AND SANDWICH STRUCTURE

(71) Applicant: Mitsubishi Gas Chemical Company, Inc., Tokyo (JP)

(72) Inventors: Nobuhiko Matsumoto, Kanagawa (JP); Kazuya Sato, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 310 days.

(21) Appl. No.: 15/570,990

(22) PCT Filed: Apr. 13, 2016

(86) PCT No.: PCT/JP2016/061911
§ 371 (c)(1),
(2) Date: Oct. 31, 2017

(87) PCT Pub. No.: WO2016/181745
PCT Pub. Date: Nov. 17, 2016

(65) Prior Publication Data
US 2018/0345621 A1 Dec. 6, 2018

(30) Foreign Application Priority Data
May 8, 2015 (JP) .................................. 2015-095525

(51) Int. Cl.
*B32B 3/12* (2006.01)
*B32B 27/34* (2006.01)
(Continued)

(52) U.S. Cl.
CPC .................. *B32B 3/12* (2013.01); *B32B 7/12* (2013.01); *B32B 27/34* (2013.01); *C08L 77/02* (2013.01);
(Continued)

(58) Field of Classification Search
None
See application file for complete search history.

(56) References Cited

U.S. PATENT DOCUMENTS

| 5,723,568 A | 3/1998 | Shimada et al. |
| 2008/0176027 A1 | 7/2008 | Pflug et al. |
| 2014/0342145 A1 | 11/2014 | Oguro et al. |

FOREIGN PATENT DOCUMENTS

| JP | S56-150534 A | 11/1981 |
| JP | H08-60588 A | 3/1996 |

(Continued)

OTHER PUBLICATIONS

Machine Translation of JP2010248417A with appended Table 1 (translated Nov. 7, 2019) (Year: 2010).*

(Continued)

*Primary Examiner* — David Sample
*Assistant Examiner* — Elizabeth Collister
(74) *Attorney, Agent, or Firm* — Fitch, Even, Tabin & Flannery LLP

(57) ABSTRACT

The present invention provides a honeycomb structure formed from a thermoplastic resin composition comprising: aromatic polyamide (A) which includes diamine units containing at least 70 mol % of xylylenediamine units and dicarboxylic acid units containing at least 50 mol % of $C_{4-20}$ α,ω-linear aliphatic dicarboxylic acid units; and aliphatic polyamide (B) which includes aliphatic groups as repetitive units and in which the total of 10 to 24 carbons form the aliphatic groups. The composition ratio of aromatic poly- (Continued)

amide (A):aliphatic polyamide (B) is within a range of 100:25 to 400 by mass standard. Also provided is a sandwich structure obtained by disposing flat plates at the top surface and bottom surface of the honeycomb structure, and a honeycomb substrate obtained by molding the thermoplastic resin composition into a film or a sheet.

14 Claims, 4 Drawing Sheets

(51) Int. Cl.
  C08L 77/06 (2006.01)
  C08L 77/02 (2006.01)
  B32B 7/12 (2006.01)
  E04C 2/36 (2006.01)
(52) U.S. Cl.
  CPC .............. C08L 77/06 (2013.01); E04C 2/365 (2013.01); B32B 2250/03 (2013.01); B32B 2250/24 (2013.01); B32B 2262/101 (2013.01); B32B 2305/024 (2013.01); B32B 2307/306 (2013.01); B32B 2307/546 (2013.01); B32B 2307/558 (2013.01); B32B 2307/7242 (2013.01); B32B 2419/00 (2013.01); B32B 2457/00 (2013.01); B32B 2509/00 (2013.01); B32B 2535/00 (2013.01); B32B 2605/08 (2013.01); B32B 2605/12 (2013.01); B32B 2605/18 (2013.01)

(56) References Cited

FOREIGN PATENT DOCUMENTS

| JP | H08-199062 A | 8/1996 |
| JP | H08-319420 A | 12/1996 |
| JP | 2000-246818 A | 9/2000 |
| JP | 2006-131890 A | 5/2006 |
| JP | 2008-520456 A | 6/2008 |
| JP | 2010-248417 A | 11/2010 |
| JP | 2013-237242 A | 11/2013 |
| WO | 2013/180978 A1 | 12/2013 |

OTHER PUBLICATIONS

Machine Translation of JP2013237424A (translated Nov. 9, 2019) (Year: 2013).*
International Search Report for PCT/JP2016/061911 dated Jun. 28, 2016; English translation submitted herewith (5 pages).
Extended European Search Report issued in corresponding European Application No. 16792470.3 dated Mar. 28, 2019 (16 pages).
Supplementary Partial European Search Report issued in corresponding European Application No. 16792470.3 dated Nov. 29, 2018 (18 pages).

* cited by examiner

HONEYCOMB STRUCTURE AND SANDWICH STRUCTURE, AND BASE MATERIAL FOR HONEYCOMB FOR PRODUCING HONEYCOMB STRUCTURE AND SANDWICH STRUCTURE

CROSS-REFERENCE TO RELATED APPLICATIONS

This application is a U.S. national phase application filed under 35 U.S.C. § 371 of International Application PCT/JP2016/061911, filed on Apr. 13, 2016, designating the United States, which claims priority from Japanese Application Number 2015-095525, filed May 8, 2015.

FIELD OF THE INVENTION

The present invention relates to a honeycomb structure, to a sandwich structure in which flat plates are disposed on top and bottom sides of the honeycomb structure, and to a base material for honeycomb for producing the same.

BACKGROUND OF THE INVENTION

Since a honeycomb structure is light in weight and excellent in mechanical properties, it has been widely used heretofore as an interior material, an exterior material or the like for structures used in various industrial fields including vehicles such as automobiles, aircrafts and ships and building construction. In addition, a synthetic resin honeycomb structure has also been employed as an impact absorbing part for automobiles or the like.

For example, Japanese Unexamined Patent Application Publication No. 2013-237242 (Patent literature 1) describes that a honeycomb structure that has both rigidity and impact absorbing property and that has excellent continuous moldability can be achieved by using a thermoplastic resin composition that is obtained by blending an ethylene-unsaturated carboxylic acid ester copolymer such as a glycidyl methacrylate-modified polyethylene copolymer with a polyamide such as nylon 6 to produce a honeycomb structure having a specific cell shape.

Since, however, conventional honeycomb structures are inadequate in water resistance, the mechanical properties of the honeycomb structures are degraded once water intrudes inside them, which raises a problem of limiting the usage thereof. In addition, there has been a need for expanding its applications by enhancing gas barrier property and heat resistance and by further enhancing the strength and the elastic modulus.

CITATION LIST

Patent Literature

[Patent Literature 1] Japanese Unexamined Patent Application Publication No. 2013-237242

SUMMARY OF INVENTION

Under such circumstances, a honeycomb structure and a sandwich structure that are light in weight and that are excellent in mechanical properties, gas barrier property, water resistance and heat resistance, and a base material for honeycomb that facilitates productions of the same have been needed.

The present inventors have gone through keen studies in view of the above-described problem, and as a result of which found that a honeycomb structure made from a thermoplastic resin composition, which is obtained by blending an aromatic polyamide containing a xylylene-based diamine unit and a linear α,ω-aliphatic dicarboxylic acid unit in predetermined ranges with an aliphatic polyamide at a predetermined composition ratio, can be used to obtain a structure that is light in weight, that has excellent mechanical properties such as rigidity and toughness, and that is also excellent in gas barrier property, water resistance and heat resistance. In addition, they found that a base material for honeycomb obtained by molding a thermoplastic resin composition into a film or a sheet, where the thermoplastic resin composition is obtained by blending an aromatic polyamide including a xylylene-based diamine unit and a linear α,ω-aliphatic dicarboxylic acid unit in predetermined ranges with an aliphatic polyamide at a predetermined composition ratio, is unlikely to cause unevenness such as cracks and wrinkles upon molding into a honeycomb structure and also excellent in moldability because cell members such as adjacent cell sidewalls can easily be welded to each other. They also found that at least a part of the base material for honeycomb can be stretched upon molding the above-described base material for honeycomb into a honeycomb structure so that the mechanical properties and the gas barrier property of the resulting honeycomb structure can further be enhanced, thereby accomplishing the present invention.

Specifically, the present invention provides a honeycomb structure, a sandwich structure and a base material for honeycomb used for producing the same described below.

[1] A honeycomb structure comprising a thermoplastic resin composition comprising an aromatic polyamide (A) and an aliphatic polyamide (B), wherein:

the aromatic polyamide (A) is a polyamide including a diamine unit containing 70 mol % or more of a xylylenediamine unit and a dicarboxylic acid unit containing 50 mol % or more of a $C_{4-20}$ linear α,ω-aliphatic dicarboxylic acid unit;

the aliphatic polyamide (B) is a polyamide including aliphatic groups as repetitive units, where the total number of carbons forming the aliphatic groups is 10-24; and the composition ratio of aromatic polyamide (A):aliphatic polyamide (B) is in a range of 100:25-400 on a mass basis.

[2] The honeycomb structure according to [1], wherein the xylylenediamine unit of the aromatic polyamide (A) is derived from meta-xylylenediamine, para-xylylenediamine or a mixture thereof, and the $C_{4-20}$ linear α,ω-aliphatic dicarboxylic acid unit is derived from adipic acid, sebacic acid or a mixture thereof.

[3] The honeycomb structure according to either one of [1] and [2], wherein the aliphatic polyamide (B) is one or more types selected from the group consisting of polyamide 11, polyamide 12, polyamide 6,6, polyamide 6,10, polyamide 6,12 and polyamide 10,10.

[4] The honeycomb structure according to any one of [1]-[3], wherein the simulated fuel CE10 permeability of the thermoplastic resin composition forming the honeycomb structure is 15 (g·mm/m²·day) or less.

[5] The honeycomb structure according to any one of [1]-[4], wherein the tensile elastic modulus of the thermoplastic resin composition forming the honeycomb structure is in a range of 500-2500 MPa.

[6] The honeycomb structure according to any one of [1]-[5], wherein the deflection temperature under load (load 1.80 MPa) of the thermoplastic resin composition forming the honeycomb structure is in a range of 40-150° C.

[7] The honeycomb structure according to any one of [1]-[6] which is formed of a plurality of cells, wherein:

each of the cells is defined by a hexagonal surface layer that continuously or intermittently joins the cells together at either top or bottom side, and has cell sidewalls that annularly adjoin each other;

the hexagonal surface layer and the cell sidewalls are perpendicular to each other; and the honeycomb structure is formed by folding, substantially without cutting, a honeycomb structure part that is obtained through plastic deformation of the base material for honeycomb and that has a three-dimensional structure and a connection region that becomes the hexagonal surface layer after folding.

[8] The honeycomb structure according to [7], wherein the cell sidewalls and the surface layer are partially stretched in a direction horizontal to the surface layer.

[9] The honeycomb structure according to either one of [7] and [8], wherein at least some of the cell sidewalls are completely or partially joined together.

[10] A sandwich structure obtained by disposing flat plates made of the same material as the material making the honeycomb structure on the top and bottom sides of the honeycomb structure according to any one of [1]-[9].

[11] A sandwich structure obtained by disposing flat plates made of a material different from the material making the honeycomb structure on the top and bottom sides of the honeycomb structure according to any one of [1]-[9].

[12] A base material for honeycomb comprising a thermoplastic resin composition comprising an aromatic polyamide (A) and an aliphatic polyamide (B), for producing the honeycomb structure according to any one of [1]-[9] or the sandwich structure according to either one of [10] and [11], wherein:

the aromatic polyamide (A) is a polyamide including a diamine unit containing 70 mol % or more of a xylylenediamine unit and a dicarboxylic acid unit containing 50 mol % or more of a $C_{4-20}$ linear α,ω-aliphatic dicarboxylic acid unit;

the aliphatic polyamide (B) is a polyamide including aliphatic groups as repetitive units, where the total number of carbons forming the aliphatic groups is 10-24; and the composition ratio of aromatic polyamide (A):aliphatic polyamide (B) is in a range of 100:25-400 on a mass basis.

According to the present invention, a honeycomb structure and a sandwich structure that are light in weight, and that is excellent in mechanical properties, gas barrier property, water resistance and heat resistance, and a base material for honeycomb that facilitates productions of the honeycomb structure and the sandwich structure can be obtained.

DESCRIPTION OF EMBODIMENTS

Figure 1:
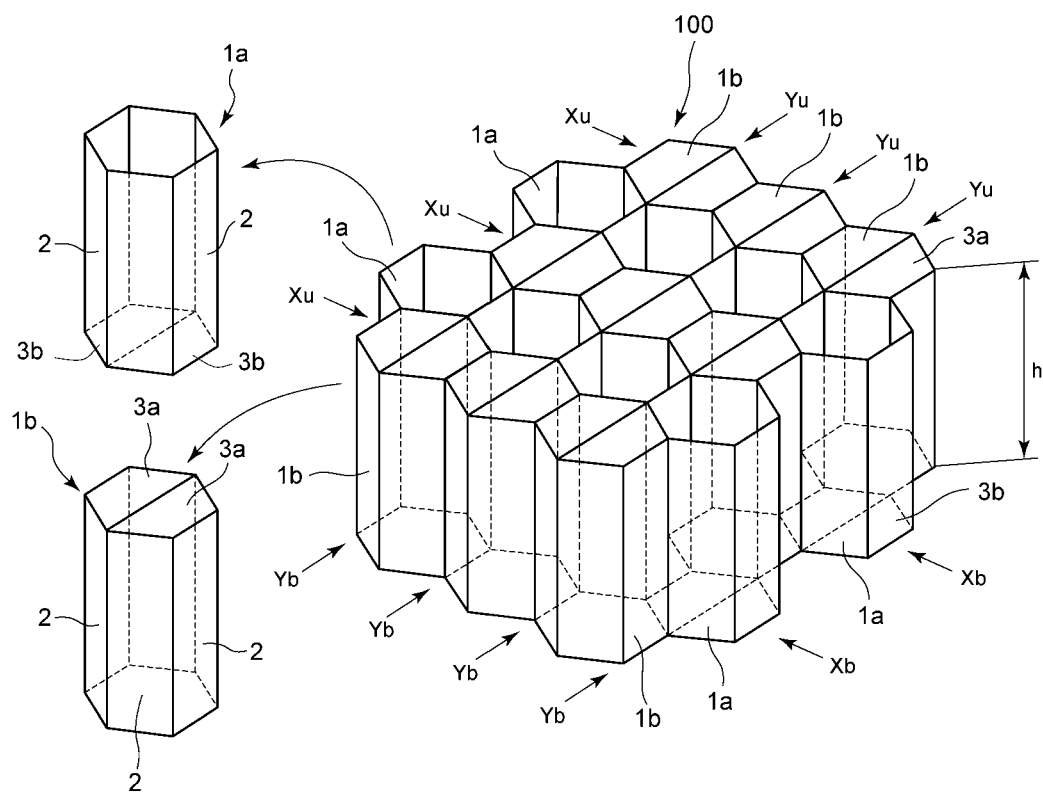
FIG. 1 A schematic perspective view showing a part of a honeycomb structure of one embodiment of the present invention.

Hereinafter, preferable embodiments of a honeycomb structure and a sandwich structure, and a base material for honeycomb for producing the same of the present invention will be described in a specific manner.

1. Honeycomb Structure

First, a honeycomb structure of the present invention will be described.

The honeycomb structure of the present invention comprises a thermoplastic resin composition comprising an aromatic polyamide (A) and an aliphatic polyamide (B), wherein:

the aromatic polyamide (A) is a polyamide including a diamine unit containing 70 mol % or more of a meta-xylylenediamine unit, and a dicarboxylic acid unit containing 50 mol % or more of a $C_{4-20}$ linear α,ω-aliphatic dicarboxylic acid unit;

the aliphatic polyamide (B) is a polyamide including aliphatic groups as repetitive units, where the total number of carbons forming the aliphatic groups is 10-24; and the composition ratio of aromatic polyamide (A):aliphatic polyamide (B) is in a range of 100: 25-400 on a mass basis.

As described above, the honeycomb structure of the present invention is produced from a thermoplastic resin composition containing specific aromatic polyamide (A) and aliphatic polyamide (B) at a predetermined composition ratio. According to the present invention, the above-described thermoplastic resin composition is used as the material of a honeycomb structure so that a honeycomb structure that is light in weight, and excellent in mechanical properties, gas barrier property, water resistance, heat resistance and moldability can be obtained. In a preferable aspect of the present invention, at least a part of the thermoplastic resin composition is stretched upon molding it into a honeycomb structure so that the mechanical properties and the gas barrier property of the resulting honeycomb structure can further be enhanced. Although not intended to be constrained by theory, stretching aligns the aromatic polyamide (A) and the aliphatic polyamide (B) of the thermoplastic resin composition to form a layered structure so that presumably the gas barrier property is enhanced due to the maze effect and the mechanical properties are enhanced as well. Hereinafter, the aromatic polyamide (A) and the aliphatic polyamide (B) as components of the thermoplastic resin composition forming the honeycomb structure will be described.

(1) Aromatic Polyamide (A)

The aromatic polyamide (A) used with the present invention is a polyamide including a diamine unit containing 70 mol % or more of a xylylenediamine unit represented by General formula (I) below, and a dicarboxylic acid unit containing 50 mol % or more of a $C_{4-20}$ linear α,ω-aliphatic dicarboxylic acid unit represented by General formula (II) below;

[Chemical Formula 1]

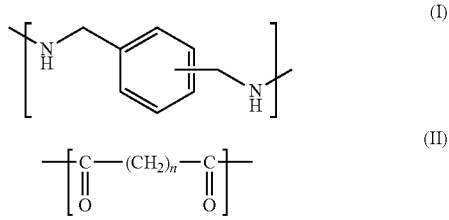

in Formula (II), n is an integer of 2-18.

Here, the sum of the diamine unit and the dicarboxylic acid unit should not exceed 100 mol %. In addition, the aromatic polyamide (A) may include a structural unit other than the above-described units within a range that does not impair the effect of the present invention.

The diamine unit of the aromatic polyamide (A) contains 70 mol % or more of the xylylenediamine unit represented by General formula (I) above in the diamine unit. The xylylenediamine unit contained in the diamine unit is preferably 80 mol % or more, more preferably 90 mol % or more and still more preferably 95 mol % or more.

Examples of a compound that may constitute the xylylenediamine unit include ortho-xylylenediamine, meta-xylylenediamine and para-xylylenediamine. Among them, meta-xylylenediamine, para-xylylenediamine or a mixture thereof is preferably used and meta-xylylenediamine is more preferably used.

Preferably 70 mol % or more, more preferably 80 mol % or more and particularly preferably 90 mol % or more of a meta-xylylenediamine unit is contained in the diamine unit so that the honeycomb structure of the present invention can exert not only water resistance and heat resistance but also high strength, high elastic modulus and excellent gas barrier property, thereby rendering a thermoplastic resin composition to have good moldability.

In a case where a mixture of meta-xylylenediamine and para-xylylenediamine is used as the xylylenediamine constituting the xylylenediamine unit of the aromatic polyamide (A), the proportion of para-xylylenediamine to the total amount of meta-xylylenediamine and para-xylylenediamine is preferably 90 mol % or less, more preferably 50 mol % or less, and still more preferably 35 mol % or less.

As long as the proportion of para-xylylenediamine is 90 mol % or less, moderate heat resistance and crystalline property can be imparted to the aromatic polyamide (A), and good moldability of the thermoplastic resin composition can be achieved.

Examples of a compound other than the xylylenediamine unit which may constitute the diamine unit include, but not limited to, aromatic diamines such as para-phenylenediamine; alicyclic diamines such as 1,2-bis(aminomethyl) cyclohexane, 1,3-bis(aminomethyl)cyclohexane and 1,4-bis(aminomethyl)cyclohexane; aliphatic diamines such as ethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylene, dodecamethylenediamine, 2-methyl-1,5-pentane diamine and 1-amino-3-aminomethyl-3,5,5-trimethylcyclohexane; and polyether-based diamines that have an ether bond as represented by Huntsman's Jeffamine and Elastamine (both are trade names). They may be used alone or two or more types of them may be used in combination.

According to the present invention, the dicarboxylic acid unit of the polyamide (A) contains the linear α,ω-aliphatic dicarboxylic acid unit represented by General Formula (II) above for a total of 50 mol % or more in the dicarboxylic acid unit. From the standpoints of reactivity upon polymerization as well as crystalline property and moldability of the polyamide, the content of the linear α,ω-aliphatic dicarboxylic acid unit in the dicarboxylic acid unit is preferably 70 mol % or more, more preferably 80 mol % or more, and still more preferably 90 mol % or more.

In General Formula (II), n is an integer of 2-18, preferably 3-16, more preferably 4-12 and still more preferably 4-8.

Examples of a compound that may constitute the dicarboxylic acid unit represented by General Formula (II) include, but not limited to, succinic acid, glutaric acid, adipic acid, pimelic acid, suberic acid, azelaic acid, sebacic acid, 1,10-decanedicarboxylic acid, 1,11-undecanedicarboxylic acid and 1,12-dodecanedicarboxylic acid. They may be used alone or two or more types of them may be used in combination. Among them, adipic acid, sebacic acid or a mixture thereof is preferably used and sebacic acid is particularly preferably used since they can impart excellent strength, elastic modulus and workability.

Examples of a compound that may constitute a dicarboxylic acid unit other than the dicarboxylic acid unit represented by General Formula (II) include, but not limited to, dicarboxylic acids such as oxalic acid, malonic acid, fumaric acid, maleic acid, 1,3-benzene diacetate, 1,4-benzene diacetate, terephthalic acid, isophthalic acid and 2,6-naphthalene dicarboxylic acid. They may be used alone or two or more types of them may be used in combination. The dicarboxylic acid unit other than the dicarboxylic acid unit represented by General formula (II) is present in the dicarboxylic acid unit for a total of preferably 40 mol % or less, more preferably 20 mol % or less and still more preferably 10 mol % or less.

In one embodiment of the present invention, a dicarboxylic acid unit other than the dicarboxylic acid unit represented by General formula (II) can be included so as to adjust the melting point of the aromatic polyamide (A). For example, the melting point of the aromatic polyamide (A) and the melting point of the aliphatic polyamide (B) can be made close so as to further enhance moldability.

Moreover, for example, if isophthalic acid is used as a dicarboxylic acid unit other than the dicarboxylic acid unit represented by General formula (II), the crystallization rate can be made slower, which is advantageous in terms of vacuum moldability. In this case, the content of the dicarboxylic acid unit other than the dicarboxylic acid unit represented by General formula (II) is preferably 1-40 mol %, more preferably 1-20 mol % and still more preferably 5-10 mol % in total in the dicarboxylic acid unit.

The type and the content of the dicarboxylic acid unit other than the dicarboxylic acid unit represented by General formula (II) may appropriately be selected.

As to the linear α,ω-aliphatic dicarboxylic acid unit of the aromatic polyamide (A), the adipic acid unit is preferably contained in the linear α,ω-aliphatic dicarboxylic acid unit for 50 mol % or more from the stand points of water resistance, mechanical properties, moldability and thermal properties such as suitable glass-transition temperature and melting point of the aromatic polyamide (A). Moreover, in terms of imparting moderate water resistance, mechanical properties and moldability to the aromatic polyamide (A), the sebacic acid unit is preferably contained in the linear α,ω-aliphatic dicarboxylic acid unit for 50 mol % or more.

The melting point Tm of the aromatic polyamide (A) is preferably 190-290° C. and more preferably 190-260° C. Herein, the melting point Tm is measured by the method described in the example.

While the number-average molecular weight (Mn) of the aromatic polyamide (A) in terms of polystyrene as measured by gel permeation chromatography (hereinafter, simply referred to as "GPC") is not particularly limited, it is preferably 2000 or more, more preferably 3000 or more, and still more preferably 4000 or more. Moreover, it is preferably 40000 or less, more preferably 30000 or less and still more preferably 20000 or less. As long as the number-average molecular weight is within the above-mentioned range, the amount of the unreacted substance as polyamide can be made small and the behavior can be stable. Meanwhile, the quantity of the component whose number-average molecular weight is 1000 or less is preferably 5% or less by mass, more preferably 4% by mass and still more preferably 3% or less by mass. As long as the quantity of the component with a number-average molecular weight of 1000 or less is within the above-mentioned range, moderate fluidity and good vacuum moldability are likely to be obtained.

The aromatic polyamide (A) can be produced by polycondensating a diamine component and a dicarboxylic acid component. The polymerization degree can be controlled by adjusting the polycondensation conditions and else. A small amount of monoamine or monocarboxylic acid may be added upon polycondensation as a molecular weight regulator. Furthermore, the polycondensation reaction can be suppressed to achieve a desired polymerization degree by adjusting the ratio (molar ratio) of the diamine component and the carboxylic acid component constituting the aromatic polyamide (A) to shift from 1.

Examples of a method for polycondensating the aromatic polyamide (A) include, but not limited to, a reactive extrusion method, a pressure salt method, a normal pressure drop method and a pressure drop method. Among these methods, a normal pressure drop method and a pressure drop method are preferable in terms of cost merit of not using a solvent. In addition, the reaction temperature is set as low as possible so that yellowing or gelling of the aromatic polyamide (A) can be prevented, which is preferable to obtain a polyamide (A) with stable behavior.

The reactive extrusion method is a method in which a polyamide containing a diamine component and a dicarboxylic acid component is melt kneaded and allowed to react in an extruder. Raw materials for the reactive extrusion method may be used in such a manner that the diamine component and the dicarboxylic acid are directly fed, or they may be prepared into a polyamide salt or a polyamide oligomer with a number-average molecular weight of 2000 or less using a polymerization vessel before being fed. Furthermore, in order to prevent deterioration of the polyamide, the reaction is preferably allowed to proceed under a nitrogen atmosphere while removing water with a multistage open vent or a vacuum vent.

The pressure salt method is a method in which melt polycondensation is performed under pressure using a nylon salt as a raw material. Specifically, an aqueous nylon salt solution containing a diamine component and a dicarboxylic acid component is prepared, which is then concentrated, and allowed to polycondense under pressure while increasing the temperature and removing the condensation water. While the pressure inside the tank is gradually returned to normal pressure, the temperature is increased to and maintained at about [melting point of aromatic polyamide (A)+10° C.]. Furthermore, the temperature is maintained while the pressure is gradually reduced to 0.02 MPaG to continue the polycondensation. Once a certain stirring torque is reached, the pressure inside the tank is increased with nitrogen to about 0.3 MPaG to collect the aromatic polyamide (A).

The normal pressure drop method is a method in which a dicarboxylic acid component is heat melted under normal pressure, and polycondensed by continuously dropping a diamine component while removing the condensation water. In this case, the polycondensation reaction is performed while increasing the temperature of the reaction system such that the reaction temperature does not fall below the melting point of the generated polyamide compound. The normal pressure drop method has a higher yield per batch as compared to the above-described pressure salt method since it does not use water for dissolving salt. In addition, since it does not require vaporization/condensation of the raw material components, decrease in the reaction rate can be small and thus the process time can be shortened.

The pressure drop method is a method in which a dicarboxylic acid component is first fed into a polycondensation tank and heat melted, and then it is polycondensed by continuously dropping a diamine component while applying pressure of preferably about 0.3-0.4 MPaG inside the tank and removing the condensation water. In this case, the polycondensation reaction is performed while increasing the temperature of the reaction system such that the reaction temperature does not fall below the melting point of the generated polyamide compound. Once the set molar ratio is reached, dropping of the diamine component is stopped, and the temperature is increased to and maintained at about [melting point of aromatic polyamide (A)+10° C.] while gradually returning the pressure inside the tank to normal pressure. Subsequently, the temperature is maintained while the pressure is gradually reduced to 0.02 MPaG to continue the polycondensation. Once a certain stirring torque is reached, the pressure inside the tank is increased with nitrogen to about 0.3 MPaG to collect a polyamide compound.

A method for adjusting the melt viscosity, that is, the number-average molecular weight, of the aromatic polyamide (A) may be a method in which the termination point of the polymerization is judged by the stirring torque as in the above-described polymerization, or a method in which the number-average molecular weight of interest is set by adjusting the molar ratio to shift from 1 in advance at the stage of feeding the monomer.

For polycondensation of the aromatic polyamide (A), a phosphorus atom-containing compound is preferably added from the standpoint of promoting the amidation reaction.

Examples of the phosphorus atom-containing compound include: phosphinic acid compounds such as dimethylphosphinic acid and phenylmethylphosphinic acid; hypophosphorous acid compounds such as hypophosphorous acid, sodium hypophosphite, potassium hypophosphite, lithium hypophosphite, magnesium hypophosphite, calcium hypophosphite and ethyl hypophosphite; phosphonic acid compounds such as phosphonic acid, sodium phosphonate, potassium phosphonate, lithium phosphonate, potassium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate and potassium ethylphosphonate; phosphonous acid compounds such as phosphonous acid, sodium phosphonite, lithium phosphonite, potassium phosphonite, magnesium phosphonite, calcium phosphonite, phenylphosphonous acid, sodium phenylphosphonite, potassium phenylphosphonite, lithium phenylphosphonite and ethyl phenylphosphonite; and phosphorous acid compounds such as phosphorous acid, sodium hydrogenphosphite, sodium phosphite, lithium phosphite, potassium phosphite, magnesium phosphite, calcium phosphite, triethyl phosphite, triphenyl phosphite and pyrophosphorous acid.

Among them, hypophosphite metal salts such as sodium hypophosphite, potassium hypophosphite and lithium hypophosphite are particularly preferably used since they are highly effective in promoting amidation reaction and have an excellent effect of preventing coloring. In particular, sodium hypophosphite is preferable. The phosphorus atom-containing compound that can be used with the present invention is not limited to these compounds.

The added amount of the phosphorus atom-containing compound is preferably 0.1-1000 ppm, more preferably 1-600 ppm and still more preferably 5-400 ppm in terms of the phosphorus atom concentration in the polyamide (A). If it is 0.1 ppm or higher, the polyamide (A) is less likely to be colored during polymerization and thus transparency can be enhanced. If it is 1000 ppm or lower, the polyamide (A) is less likely to gelate, and mixing of fisheyes in the molded product which is considered to be caused by the phosphorus atom-containing compound can be reduced, giving good appearance to the molded product.

Furthermore, an alkali metal compound is preferably added, in combination with the phosphorus atom-containing compound, to the polycondensation system of the aromatic polyamide (A). In order to prevent coloring of the polyamide compound during the polycondensation, the phosphorus atom-containing compound needs to exist for a sufficient amount, which, in some cases, may cause gelling of the polyamide compound. Thus, it is preferable to have an alkali metal compound coexist, also for adjusting the amidation reaction rate.

As the alkali metal compound, an alkali metal hydroxide, an alkali metal acetate, an alkali metal carbonate, an alkali metal alkoxide or the like is preferable. Specific examples of the alkali metal compound include lithium hydroxide, sodium hydroxide, potassium hydroxide, rubidium hydroxide, cesium hydroxide, lithium acetate, sodium acetate, potassium acetate, rubidium acetate, cesium acetate, sodium methoxide, sodium ethoxide, sodium propoxide, sodium butoxide, potassium methoxide, lithium methoxide and sodium carbonate, although it can be used without being limited to these compounds.

From the standpoints of controlling the polymerization rate and reducing yellowness, the ratio of the phosphorus atom-containing compound and the alkali metal compound is such that (phosphorus atom-containing compound):(alkali metal compound) is in a range of preferably 1.0:0.05-1.5, more preferably 1.0:0.1-1.2, and still more preferably 1.0: 0.2-1.1.

(2) Aliphatic Polyamide (B)

The aliphatic polyamide (B) used with the present invention is a polyamide including aliphatic groups as repetitive units, wherein the total number of carbons forming the aliphatic groups is 10-24. Examples of the polyamide including aliphatic groups as repetitive units wherein the total number of carbons forming the aliphatic groups is 10-24 include one or more types selected from the group consisting of a polyamide (B1) including at least one of a lactam-derived structural unit with a carbon number of 10-12 or an aminocarboxylic acid-derived structural unit with a carbon number of 10-12, and a polyamide (B2) including a structural unit derived from an aliphatic diamine with a carbon number of 6-12 and a structural unit derived from an aliphatic dicarboxylic acid with a carbon number of 6-12. Hereinafter, the polyamides (B1) and (B2) will be described.

[Polyamide (B1)]

The polyamide (B1) includes at least one of a lactam-derived structural unit with a carbon number of 10-12 or an aminocarboxylic acid-derived structural unit with a carbon number of 10-12.

The carbon number of the lactam-derived structural unit and the aminocarboxylic acid-derived structural unit is preferably 11-12 in terms of flexibility, availability and the like. The lactam-derived structural unit with a carbon number of 10-12 and the aminocarboxylic acid-derived structural unit with a carbon number of 10-12 usually contains an ω-aminocarboxylic acid unit represented by General formula (B-1) below.

[Chemical formula 2]

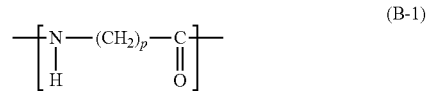

(B-1)

In the formula above, p represents an integer of 9-11, which is preferably 10-11.

Specific examples of the compound constituting the lactam-derived structural unit with a carbon number of 10-12 include decane lactam, undecane lactam and dodecane lactam. Meanwhile, examples of the compound constituting the aminocarboxylic acid-derived structural unit with a carbon number of 10-12 include 10-aminodecanoic acid, 11-aminoundecanoic acid and 12-aminododecanoic acid.

The polyamide (B1) is not limited to compounds that only consist of at least one of the lactam-derived structural unit with a carbon number of 10-12 or the aminocarboxylic acid-derived structural unit with a carbon number of 10-12, and it may be any compound as long as it includes these structural units as the main component. Herein, the phrase "include as the main component" means that other structural unit can be included as long as the effect of the present invention is not hindered. While it is not particularly limited, at least one of the lactam-derived structural unit with a carbon number of 10-12 or the aminocarboxylic acid-derived structural unit with a carbon number of 10-12 accounts for, for example, 60 mol % or more, preferably 80-100 mol % and more preferably 90-100 mol % of the structural units of the polyamide (B1), as a monomer.

Examples of other structural unit in the polyamide (B1) include structural units derived from a lactam other than the lactams with a carbon number of 10-12, an aminocarboxylic acid other than the aminocarboxylic acids with a carbon number of 10-12 and a nylon salt made of diamine and dicarboxylic acid.

Examples of the lactam other than the lactams with a carbon number of 10-12 include three- or higher-membered lactams, specifically ε-caprolactam, ω-enantholactam, α-pyrrolidone and a-piperidone. Meanwhile, examples of the aminocarboxylic acid other than the aminocarboxylic acids with a carbon number of 10-12 include 6-aminocaproic acid, 7-aminoheptanoic acid and 9-aminononanoic acid.

Examples of the diamine constituting the nylon salt include aliphatic diamines such as ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, 1,13-tridecane diamine, 1,14-tetradecane diamine, 1,15-pentadecane diamine, 1,16-hexadecane diamine, 1,17-heptadecane diamine, 1,18-octadecane diamine, 1,19-nonadecane diamine, 1,20-eicosane diamine, 2-methyl-1,5-pentane diamine, 3-methyl-1,5-pentane diamine, 2-methyl-1,8-octane diamine and 2,2,4- or 2,4,4-trimethylhexane diamine; alicyclic diamines such as 1,3- or 1,4-cyclohexanediamine, 1,3- or 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethylcyclopentane methaneamine, 5-amino-1,3,3-trimethylcyclohexane methaneamine, bis(aminopropyl)piperazine, bis(aminoethyl)piperazine, norbornane dimethylamine, tricyclodecane dimethylamine; and diamines having an aromatic ring such as para-xylylenediamine and meta-xylylenediamine.

Examples of the dicarboxylic acid constituting the nylon salt include aliphatic dicarboxylic acids such as succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid and 1,12-dodecanedicarboxylic acid; alicyclic dicarboxylic acids such as 1,3- or 1,4-cyclohexanedicarboxylic acid, dicyclohexanemethane-4,4'-dicarboxylic acid and norbornane dicarboxylic acid; and aromatic dicarboxylic acids such as isophthalic acid, terephthalic acid and 1,4-, 2,6- or 2,7-naphthalene dicarboxylic acid.

As the polyamide (B1), polyamide 11 that includes at least one of an undecane lactam-derived structural unit or a 11-aminoundecanoic acid-derived structural unit as a main component, polyamide 12 that includes at least one of a dodecane lactam-derived structural unit or a 12-aminododecanoic acid-derived structural unit as a main component, or a mixture of polyamide 11 and polyamide 12 is preferable. Alternatively, the polyamide (B1) may also be polyamide 6T/12 or polyamide 9T/12 that includes an additional structural unit other than the undecane lactam-derived structural unit or the 11-aminoundecanoic acid-derived structural unit.

The polyamide (B1) can be obtained by polymerizing the above-described constituent monomers. For example, it can be obtained by conducting ring-opening polymerization of lactam or polycondensation of aminocarboxylic acid.

The method of this polymerization is not particularly limited and any known method such as melt polymerization, solution polymerization, solid-phase polymerization or the like may be employed. These polymerization methods may be employed alone or employed in a suitable combination. As the production apparatus, a known polyamide production apparatus, for example, a batch-type reaction vessel, a continuous single- or multiple-tank reactor, a continuous tubular reactor, a kneading/reaction extruder such as a single-screw kneading extruder or a twin-screw kneading extruder, or the like may be used.

A small amount of monoamine, monocarboxylic acid or the like may be added as a molecular weight regulator upon the polycondensation of the polyamide (B1).

Furthermore, in order to achieve an effect of promoting the amidation reaction and an effect of preventing coloring upon the polycondensation, a known additive such as a phosphorus atom-containing compound, an alkali metal compound or an alkaline-earth metal compound may be added upon the polycondensation of the polyamide (B1).

The melting point Tm of the polyamide (B1) is preferably 160-240° C., more preferably 165-230° C. and still more preferably 170-225° C. from the standpoint of heat resistance and melt moldability.

[Polyamide (B2)]

The polyamide (B2) includes a structural unit derived from an aliphatic diamine with a carbon number of 6-12 and a structural unit derived from an aliphatic dicarboxylic acid with a carbon number of 6-12.

A compound that may constitute the diamine unit of the polyamide (B2) is an aliphatic diamine with a carbon number of 6-12. The aliphatic group of an aliphatic diamine with a carbon number of 6-12 is a linear or branched bivalent aliphatic hydrocarbon group, which may either be a saturated aliphatic group or an unsaturated aliphatic group, but usually a linear saturated aliphatic group.

Examples of the compound that may constitute the diamine unit of the polyamide (B2) include, but not limited to, aliphatic diamines such as hexamethylenediamine, heptamethylenediamine, octamethylenediamine, nonamethylenediamine, decamethylenediamine, undecamethylenediamine and dodecamethylenediamine. They may be used alone or two or more types of them may be used in combination.

From the standpoint of flexibility and the like, the diamine unit of the polyamide (B2) preferably contains preferably 70 mol % or more, more preferably 80-100 mol % and still more preferably 90-100 mol % of a structural unit derived from an aliphatic diamine with a carbon number of 6-12.

Accordingly, the diamine unit of the polyamide (B2) may consist only of a structural unit derived from an aliphatic diamine with a carbon number of 6-12 or may additionally contain a diamine-derived structural unit other than the aliphatic diamine with a carbon number of 6-12.

Examples of the diamine contained in the polyamide (B2) other than the aliphatic diamine with a carbon number of 6-12 include, but not limited to, aliphatic diamines such as ethylenediamine, propylenediamine, tetramethylenediamine and pentamethylenediamine; alicyclic diamines such as 1,3- or 1,4-bis(aminomethyl)cyclohexane, 1,3- or 1,4-diaminocyclohexane, bis(4-aminocyclohexyl)methane, 2,2-bis(4-aminocyclohexyl)propane, bis(aminomethyl)decalin and bis(aminomethyl)tricyclodecane; diamines having an aromatic ring such as bis(4-aminophenyl)ether, para-phenylenediamine and bis(aminomethyl)naphthalene.

The compound that may constitute the dicarboxylic acid unit of the polyamide (B2) is an aliphatic dicarboxylic acid with a carbon number of 6-12, examples being adipic acid, pimelic acid, suberic acid, azelaic acid, sebacic acid, 1,9-nonanedicarboxylic acid and 1,10-decanedicarboxylic acid. They may be used alone or two or more types of them may be used in combination.

In terms of better flexibility, the dicarboxylic acid unit of the polyamide (B2) preferably contains 70 mol % or more, more preferably 80-100 mol % and still more preferably 90-100 mol % of a structural unit derived from an aliphatic dicarboxylic acid with a carbon number of 6-12.

Accordingly, the dicarboxylic acid unit of the polyamide (B2) may consist only of a structural unit derived from an aliphatic dicarboxylic acid with a carbon number of 6-12 or may additionally contain a dicarboxylic acid-derived structural unit other than the structural unit derived from the aliphatic dicarboxylic acid with a carbon number of 6-12.

Examples of the dicarboxylic acid of the polyamide (B2) other than the aliphatic dicarboxylic acid with a carbon number of 6-12 include, but not limited to, aliphatic carboxylic acids with a carbon number of 5 or less or 13 or higher such as succinic acid, glutaric acid, 1,11-undecanedicarboxylic acid, 1,12-dodecanedicarboxylic acid, 1,13-tridecanedicarboxylic acid and 1,14-tetradecanedicarboxylic acid; and aromatic dicarboxylic acids such as terephthalic acid, isophthalic acid and 2,6-naphthalene dicarboxylic acid.

Specific examples of the polyamide (B2) preferably include polyamide 10,10, polyamide 10,12, polyamide 6,6, polyamide 6,10, polyamide 6,11, polyamide 6,12, polyamide 66/6T, polyamide 66/6I, polyamide 66/9T and a mixture thereof. Among them, polyamide 6,6, polyamide 6,10, polyamide 6,12, polyamide 10,10 or a mixture thereof is preferable.

The polyamide (B2) can be obtained by polycondensating a diamine component and a dicarboxylic acid component. For example, the polyamide can be produced by a method in which polymerization is carried out in a molten state by increasing the temperature of a salt made of a diamine component and a dicarboxylic acid component under pressure in the presence of water while removing the added water and condensation water. The polyamide can also be produced by a method in which a diamine component is added directly to a dicarboxylic acid component in a molten state and polycondensation is carried out under normal pressure. In this case, the diamine component is continuously added to the dicarboxylic acid component to keep the reaction system in a homogeneous liquid state, during which the polycondensation is allowed to proceed while increasing the temperature of the reaction system such that the reaction temperature does not fall below the melting point of the generated oligoamide and polyamide.

A small amount of monoamine, monocarboxylic acid or the like may be added as a molecular weight regulator upon polycondensating the polyamide (B2).

Furthermore, in order to achieve an effect of promoting the amidation reaction and an effect of preventing coloring upon polycondensating the polyamide (B2), a known additive such as a phosphorus atom-containing compound, an alkali metal compound or an alkaline-earth metal compound may be added.

In terms of heat resistance and melt moldability, the melting point Tm of the polyamide (B2) is preferably 160-240° C., more preferably 165-230° C. and still more preferably 170-225° C.

Specific examples of the aliphatic polyamide (B) used with the present invention are one or more types selected from the group consisting of polyamide 11, polyamide 12, polyamide 6,6, polyamide 6,10, polyamide 6,12 and polyamide 10,10, and more preferably polyamide 11, polyamide 12, polyamide 6,6, polyamide 6,10, polyamide 6,12, polyamide 10,10 or a mixture thereof.

Although the aromatic polyamide (A) is excellent in terms of gas barrier property, mechanical properties, water resistance and heat resistance, crack may occur during molding or welding by heating may be impossible with the aromatic polyamide (A) alone since it is a relatively hard material. In the honeycomb structure of the present invention, the aliphatic polyamide (B) that has a melting point relatively close to the melting point of the aromatic polyamide (A) is blended at a predetermined composition ratio, so that good moldability can be obtained without greatly impairing the mechanical properties, the gas barrier property, the water resistance and the heat resistance. In a preferable aspect of the present invention, the difference in the melting points between the aromatic polyamide (A) and the aliphatic polyamide (B) used for the thermoplastic resin composition for forming the honeycomb structure of the present invention is preferably 70° C. or less, more preferably 60° C. or less and still more preferably 50° C. or less. If the difference in the melting points between the aromatic polyamide (A) and the aliphatic polyamide (B) is within the above-mentioned range, the thermoplastic resin composition will be excellent in vacuum moldability and the gas barrier property, the mechanical properties, the water resistance and the heat resistance of the resulting honeycomb structure will be better.

The composition ratio of aromatic polyamide (A):aliphatic polyamide (B) is in a range of 100: 25-400, preferably 100: 25-200, more preferably 100: 50-200 and still more preferably 100: 50-150, on a mass basis. By using the aromatic polyamide (A) and the aliphatic polyamide (B) at the above-mentioned composition ratio, a honeycomb structure with excellent gas barrier property, mechanical properties, heat resistance, water resistance and moldability can be obtained.

The honeycomb structure of the present invention is formed of a thermoplastic resin composition obtained by blending an aromatic polyamide (A) and an aliphatic polyamide (B) at a predetermined composition ratio. In the preferable aspect of the present invention, at least a part of the thermoplastic resin composition is stretched upon molding the thermoplastic resin composition into a honeycomb structure so that the mechanical properties and the gas barrier property of the resulting honeycomb structure can further be enhanced. Although the part to be stretched and the direction of the stretch are not particularly limited, the honeycomb structure is unlikely to buckle upon molding and the mechanical properties of the honeycomb structure can be enhanced if the part (at least a part) of the honeycomb structure that form the cell sidewalls is stretched in a direction horizontal to the face that is to be the surface layer.

The thermoplastic resin composition used with the present invention may be added with various types of generally used additives within a range that does not inhibit the purpose and the working effect of the present invention. Examples of the additive include, but not limited to, an inorganic filler, a flame retardant, a conductivity imparting agent, a crystal nucleating agent, an ultraviolet absorber, an antioxidant, a damping material, an antibacterial agent, an insecticide, a deodorizer, a coloring-preventing agent, a heat stabilizer, a mold release agent, an antistatic agent, a plasticizer, a lubricant, a colorant, a pigment, a dye, a foaming agent, an antifoamer and a coupling agent.

In the thermoplastic resin composition, the blended amount of the aromatic polyamide (A) and the aliphatic polyamide (B) are preferably 70% or more by mass, more preferably 80% or more by mass and still more preferably 90% or more by mass, in total. As long as the amount is within this range, moldability will not be impaired by any component other than the aromatic polyamide (A) and the aliphatic polyamide (B). In the thermoplastic resin composition, the aromatic polyamide (A) and the aliphatic polyamide (B) may react with the additives.

The shape of the honeycomb structure of the present invention is not particularly limited as long as it comprises the above-described thermoplastic resin composition. From the standpoint of ensuring higher strength, a plurality of hexagonal columnar cells are preferably arranged in a row.

According to one embodiment of the present invention, each of the cells constituting the honeycomb structure is preferably defined by a hexagonal surface layer that continuously or intermittently joins the cells together at either top or bottom side, and each cell has cell sidewalls that annularly adjoin each other, where the hexagonal surface layer and the cell sidewalls are perpendicular to each other.

A honeycomb structure having the above-described structure has high strength and also is excellent in continuous moldability.

FIG. 1 is a schematic perspective view showing a part of a honeycomb structure of one preferable embodiment of the present invention. In FIG. 1, a honeycomb structure 100 comprises a plurality of cells 1a and 1b, where the cells 1a and 1b each consist of cell sidewalls 2 and a surface layer. The surface layer is made of either a top member 3a or a bottom member 3b. Among the cells constituting the honeycomb structure 100, the cell 1a is composed of cell sidewalls 2 and a bottom member 3b whereas the cell 1b is composed of cell sidewalls 2 and a top member 3a. In FIG. 1, the cells 1a and 1b are each shown individually.

According to one preferable embodiment of the present invention, the honeycomb structure 100 is formed by linearly arranging a plurality of hexagonal columnar cells (cells 1a and 1b). Each of the cells has a hexagonal surface layer, namely, the top member 3a or the bottom member 3b, on either top or bottom side thereof while the other side is open. Furthermore, it has cell sidewalls 2 that annularly adjoin each other, each of which having one of the six sides of the surface layer as one of its own sides, where the surface layer and the cell sidewalls 2 are vertical to each other. Each of the cell sidewalls 2 is made of a flat rectangular plate, and each of the longer sides of the six cell sidewalls 2 adjoins the longer side of the adjacent cell sidewall 2 to form a hexagonal column, as a result of which a hexagonal edge is formed by the shorter sides of the six cell sidewalls 2. Either the upper edge or the lower edge of this hexagonal column is enclosed with the hexagonal surface layer (the top member 3a or the bottom member 3b). Moreover, the other side of the top member 3a or the bottom member 3b is open.

The cells 1b having the top members 3a are linearly arranged in the directions indicated by arrows Xu shown in the figure, where the top members 3a continuously join each other on the top side. Meanwhile, the cells 1a having the bottom members 3b are linearly arranged in the directions indicated by arrows Xb shown in the figure, where the bottom members 3b continuously join each other on the bottom side. The honeycomb structure 100 can be constituted by alternately arranging the row of continuously joined cells 1a and the row of continuously joined cells 1b. Specifically, the set of cells 1b having the top members 3a on the top side are continuously joined in the directions indicated by the arrows Xu, and intermittently joined via the cell sidewalls 2 in the directions indicated by arrows Yu that are perpendicular to the directions indicated by the arrows Xu. Meanwhile, the set of cells 1a having the bottom members 3b on the bottom side are continuously joined in the directions indicated by the arrows Xb, and intermittently joined via the cell sidewalls 2 in the directions indicated by arrows Yb that are perpendicular to the directions indicated by the arrows Xb.

The above-described honeycomb structure 100 can be formed by folding a honeycomb structure part which is formed by plastically deforming a base material for honeycomb, i.e., a single planar body obtained by molding a thermoplastic resin composition described below containing an aromatic polyamide (A) and an aliphatic polyamide (B) at a predetermined composition ratio into a film or a sheet.

According to a preferable embodiment of the present invention, from the standpoints of strength, lightness, rigidity and continuous productivity, the thickness of the cell sidewalls of the honeycomb structure 100 of the present invention is 0.05-2.0 mm, while the cell size defined by the length of the diagonal line passing the center of the hexagon (including the thickness of the cell sidewalls at both ends of the diagonal line) is preferably 11-100 times longer than the thickness of the above-described cell sidewalls. As long as the thickness of the cell sidewalls and the cell size are within the above-mentioned ranges, the strength of the honeycomb structure can be enhanced. The thickness of the cell sidewall is more preferably 0.1-1 mm, still more preferably 0.1-0.5 mm, and particularly preferably 0.1-0.3 mm. Moreover, the cell size is preferably 11-80 times, still more preferably 20-60 times and particularly preferably 30-50 times longer than the thickness of the cell sidewalls.

According to one preferable embodiment of the present invention, each of the cells constituting the honeycomb structure have a surface layer made of the top member 3a or the bottom member 3b. Since the cells have the surface layers, when the honeycomb structure receives high-speed impact, the cell sidewalls are deformed and ruptured and the surface layer formed from the thermoplastic resin composition stretches and deforms to absorb the impact. Therefore, it has higher impact absorbing property than a structure without the surface layer. Furthermore, since the surface layer serves as a bonding member between the honeycomb structure and the flat plates in the later-described sandwich structure, it also has an advantage of enhancing the adhesive strength between the honeycomb structure and the flat plates. Similar to the cell sidewalls, the thickness of the surface layer is preferably 0.05 mm-2.0 mm. Thickness that is more preferable is also the same as the case for the cell sidewalls.

The height h (i.e., the length of the longer side of the cell sidewall 2) of the honeycomb structure 100 of the present invention is not particularly limited, and may suitably be determined according to the usage. Usually, it is preferably 0.2-5.0 times longer than the cell size.

A method for producing the honeycomb structure of the present invention is not particularly limited. For example, the following methods may be employed: a production method in which a honeycomb structure part is folded, where the honeycomb structure part has three-dimensional structures and connection regions that become the surface layers after the folding obtained by plastically deforming a base material for honeycomb; a production method in which a base material for honeycombs is linearly applied with an adhesive agent and laminated into a block material, which is then deployed; and a production method in which a base material for honeycomb is folded in bellows and bonded by applying an adhesive agent to the apexes of the creases. Among them, due to excellent continuous moldability, it is preferable to produce a honeycomb structure by folding a honeycomb structure part that has three-dimensional structures and connection regions that become the surface layers after the folding obtained by plastically deforming the base material for honeycomb.

Figure 2:
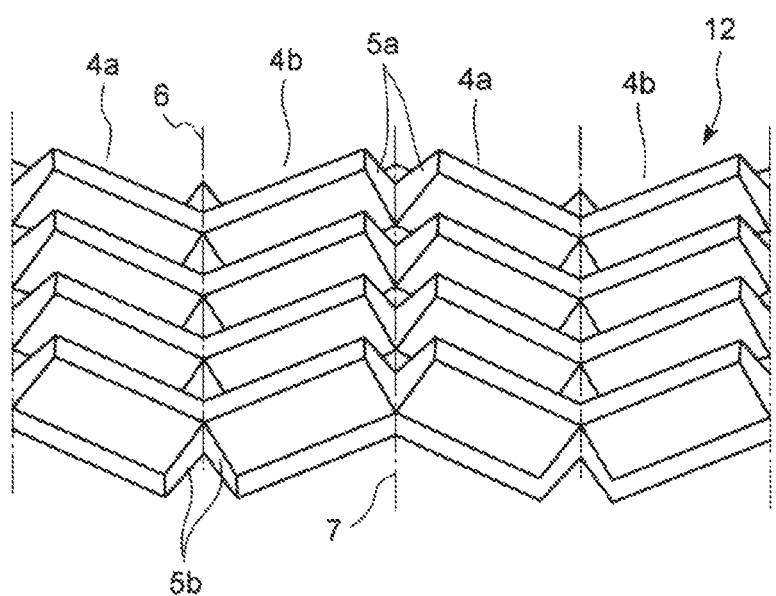
FIG. 2 A schematic perspective view showing a honeycomb structure part that has three-dimensional structures and connection regions obtained by plastically deforming a base material for honeycomb of one embodiment of the present invention.
Figure 3:
FIG. 3 A schematic cross-sectional view showing a honeycomb structure part that has three-dimensional structures and connection regions obtained by plastically deforming a base material for honeycomb of one embodiment of the present invention.
Figure 4:
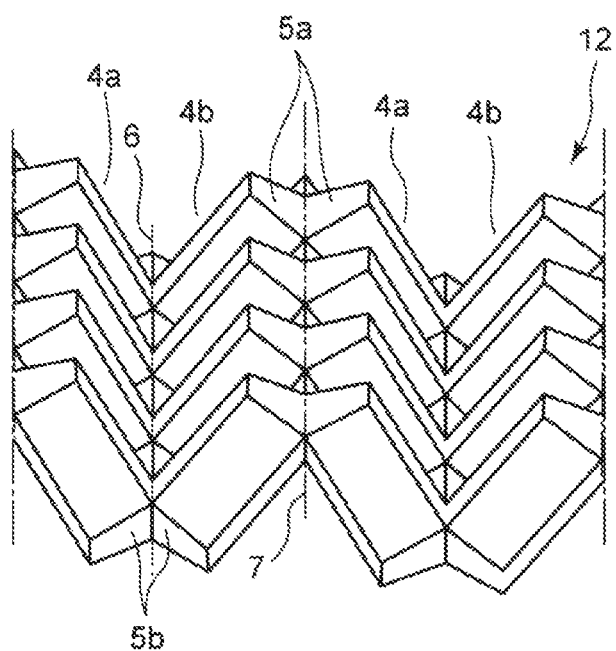
FIG. 4 A schematic perspective view showing a honeycomb structure part of one embodiment of the present invention, in a folded state.

FIG. 2 is a schematic perspective view showing one embodiment of a honeycomb structure part having three-dimensional structures and connection regions obtained by plastically deforming a base material for honeycomb of the present invention. FIG. 3 is a schematic cross-sectional view showing one embodiment of a honeycomb structure part of the present invention having three-dimensional structures and connection regions obtained by plastically deforming a base material for honeycomb. Furthermore, FIG. 4 is a schematic view showing one embodiment of a honeycomb structure part of the present invention in a folded shape.

First, a sheet of a base material for honeycomb is plastically deformed and shaped into a honeycomb structure part 12 that has three-dimensional structures 4a and 4b and connection regions 5a and 5b shown in FIG. 2. Due to this plastic deformation, the faces constituting the cross-sections of the half parts of the hexagonal columns, i.e., the trapezoidal legs, and the connection regions 5a and 5b are stretched in the direction indicated by the arrows in FIG. 3 (a direction horizontal to the connection regions 5a and 5b constituting the surface layer of the honeycomb structure), by which the honeycomb structure is unlikely to buckle upon molding and the mechanical properties and the gas barrier property of the resulting honeycomb structure can further be enhanced.

Next, the honeycomb structure part 12 is folded downward (valley-folded) at axes 6, i.e., the border lines between the three-dimensional structures 4a and 4b, such that the three-dimensional structures 4a and 4b face each other and the connection regions 5b make flat planes, while the honeycomb structure part 12 is folded upward (mountain-folded) at axes 7, i.e., the border lines between the three-dimensional structures 4b and 4a, such that the connection regions 5a make flat planes. After the folding, the three-dimensional structures 4a and 4b constitute the cell sidewalls 2 of the cells 1a and 1b shown in FIG. 1, where the downwardly folded connection regions 5a are unfolded and make flat planes by the upward folding at the axes 7, thereby constituting the top members 3a. Meanwhile, the upwardly folded connection regions 5b are unfolded and make flat planes by the downward folding at the axes 6, thereby constituting the lower members 3b. In the figure, the axes 6 correspond to the directions indicated by the arrows Yb in FIG. 1 while the axes 7 correspond to the directions indicated by the arrows Yu.

Preferably, in the row of the cells 1b that are continuously arranged in the direction indicated by the arrow Xu in FIG. 1, the mutually facing cell sidewalls 2 of the adjacent cells 1b is at least partially joined to each other with an adhesive agent, through heat welding or the like. Preferably, in the row of the cells 1a that are continuously arranged in the direction indicated by the arrow Xb, the mutually facing cell sidewalls 2 of the adjacent cells 1a is at least partially joined to each other with an adhesive agent, through heat welding or the like. In a preferable embodiment of the present invention, at least a part of the mutually facing cell sidewalls 2 of the adjacent cells 1a is preferably completely or partially joined to each other, while all of the mutually facing cell sidewalls 2 of the adjacent cells 1a is preferably completely or partially joined to each other. In addition, in a preferable embodiment of the present invention, cell sidewalls that are not joined with other cell sidewalls are preferably the cell sidewalls stretched in a direction horizontal to the surface layer. The surface layer is also preferably stretched. If the cell sidewalls that are not joined with other cell sidewalls and the surface layer are stretched, the mechanical properties of the honeycomb structure can more effectively be enhanced.

The base material for honeycomb can be plastically deformed, for example, through vacuum molding using a rotary-type roll. Rolls that mutually engage and operate facing each other may be used. While heating is required for plastically deforming the base material for honeycomb, the heating method is not particularly limited. For example, a method in which the base material for honeycomb is brought into contact with heated rolls, or a method in which the base material for honeycomb is passed between upper and lower heaters may be employed. Alternatively, the base material for honeycomb can be plastically deformed during the cooling process of sheet molding with an extruder.

The three-dimensional structures 4a and 4b as well as the connection regions 5a and 5b constituting the honeycomb structure part resulting from plastic deformation of the base material for honeycomb, are not just simply formed but they are preferably formed such that the three-dimensional structures 4a and 4b form V-shapes with the axes 6, i.e., the border lines, as the apexes (for example, the angle between the three-dimensional structures 4a and 4b is 170-190°) while the connection regions 5a and 5b form V-shapes with the axes 6 and 7 as the apexes (for example, the angle between the connection regions 5a and 5b is) 60-90°. By forming the above-described V-shapes upon plastic deformation, folding can efficiently be done in the subsequent folding step.

Figure 5:
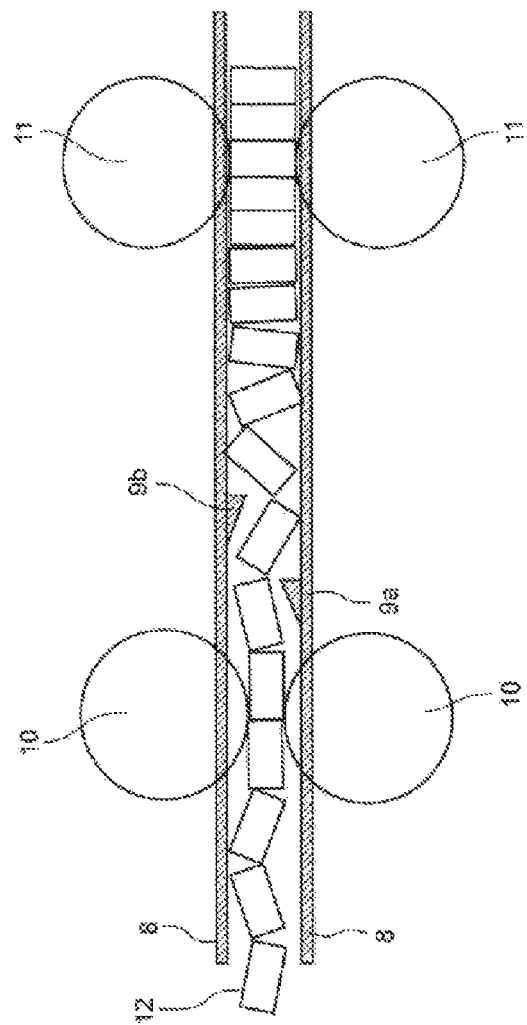
FIG. 5 A view for illustrating one aspect of a step of folding a honeycomb structure part of one embodiment of the present invention.

Hereinafter, one embodiment of the folding step following the formation of the honeycomb structure part 12 by plastic deformation of the base material for honeycomb will be described with reference to FIG. 5, although the method for folding the honeycomb structure part of the present invention is not limited thereto. The honeycomb structure part 12 obtained by plastically deforming the base material for honeycomb is sent to the downstream folding step by feed rolls 10 while passing between guiding grids 8. The downward folding at the axes 6 and the upward folding at the axes 7 begin at folding guides 9a and 9b inside the guiding grids provided downstream from the feed rolls 10. Thereafter, the honeycomb structure part 12 is drawn in by the draw-in rolls 11 placed downstream from the folding guides 9a and 9b. The rotation speed of the draw-in rolls 11 is set to be slower than the rotation speed of the feed rolls 10. Due to this difference in the rotation speeds, a completely folded honeycomb structure can be formed continuously.

For details of the method for producing a honeycomb structure, see Japanese

Unexamined Patent Application Publication No. 2000-326430, Japanese Unexamined Patent Application Publication (Translation of PCT) No. 2008-520456 and Japanese Unexamined Patent Application Publication No. 2013-237242.

2. Sandwich Structure

Next, a sandwich structure of the present invention will be described. A sandwich structure of the present invention can be made by placing flat plates suitable for the purpose on the above-described top and bottom sides of the honeycomb structure.

From the standpoint of adhesiveness, strength, rigidity, water resistance, heat resistance and the like, the material of the flat plates is preferably the same as the honeycomb structure of the present invention (specifically, the base material for honeycomb of the present invention). Alternatively, depending on the purpose and the usage of the sandwich structure, flat plates that are made of a different material from the honeycomb structure may be placed on the top and bottom sides of the honeycomb structure. The honeycomb structure can be joined with the flat plates, for example, with an adhesive agent, through heat welding or the like.

Examples of the flat plate material that differs from honeycomb structure include a thermoplastic resin, a thermosetting resin, a metal, wood, fiber and glass.

Examples of the thermoplastic resin used as the flat plate include polyolefin resins such as polyethylene, polypropylene and polybutylene; polyamide resins; polyester resins such as polyethylene terephthalate, polybutylene terephthalate, polycyclohexane dimethyl terephthalate and liquid crystal polyester; styrene-based resins such as a polyoxymethylene resin, a polycarbonate resin, a polyarylate resin, a polymethyl methacrylate resin, polyvinyl chloride, an ABS resin, an AES resin, an AAS resin, a polystyrene (PS) resin and a HIPS resin; a polyphenylene sulfide (PPS) resin, a modified polyphenylene ether (PPE) resin, a polyimide resin, a polyamide imide resin, a polyether imide resin, a polysulfone resin, a polyether sulfone resin, a polyether ketone resin, a polyether ether ketone resin, a phenol resin, a phenoxy resin, or a copolymer, a modified body or a fiber reinforced resin thereof. These may be used alone or two or more types of them may be used in combination.

Examples of the thermosetting resin used as the flat plate include an unsaturated polyester resin, a vinyl ester resin, an epoxy resin, a phenol (resol type) resin, an urea-melamine resin, a polyimide resin, an oxetane resin, a (meth)acrylate resin, a diallyl phthalate resin, a maleimide resin, or a copolymer, a modified body or a fiber reinforced resin thereof. These may be used alone or two or more types of them may be used in combination.

The thermoplastic resin and the thermosetting resin may be added with a filler or other additive within a range that does not impair the properties thereof.

The shape of the filler may be either fibrous or non-fibrous, or a combination of fibrous and non-fibrous fillers may be used. In a case where a filler is used, the blended amount thereof is preferably 30-400 parts by mass in total with respect to 100 parts by mass of the thermoplastic resin or the thermosetting resin.

Examples of the additive include a lubricant, a crystal nucleating agent, a whitening-preventing agent, a matting agent, a heat-resistant stabilizer, a weather-resistant stabilizer, an ultraviolet absorber, a plasticizer, a flame retardant, an antistatic agent, a coloring-preventing agent, an antioxidant and an impact resistance improving agent. Although the blended amount of the additive is not particularly limited as long as it does not impair the purpose and the working effect of the present invention, it is preferably 1-50 parts by mass in total with respect to 100 parts by mass of the thermoplastic resin or the thermosetting resin.

Examples of the metal used as the flat plate include, but not particularly limited to, iron, copper, lead, silver, gold, platinum, titanium, nickel, chromium, magnesium, iron alloys (high-tensile steel, tool steel, cutting steel, Krupp steel, chromium-molybdenum steel, manganum-molybdenum steel, stainless steel, maraging steel, Alloy 42, Invar, Kovar, Sendust, Permendur, silicon steel, KS steel, etc.), copper alloys (brass, red brass, nickel silver, bronze, nickel, red copper, constantan, Nordic gold, etc.), aluminum alloys (duralumin, silumin, etc.), nickel alloys (Hastelloy, monel, Inconel, nichrome, Sun platinum metal, permalloy, etc.), and other alloys (magnesium alloys, stellite, solder, pewter, cemented carbide, white gold, amorphous alloys). Among them, iron, copper, aluminum and stainless steel are preferably used.

Examples of wood include, but not particularly limited to, solid wood materials such as zelkova wood and chestnut wood, plywood obtained by stacking veneers, and wooden boards obtained by solidifying crushed wood chips, fiber or the like with a bonding material.

Examples of the fiber include, but not particularly limited to, vegetable fibers such as cotton and linen, animal fibers made from silk, wool or the like, chemical fibers made of nylon, polyester or the like, and inorganic fibers such as glass fiber and carbon fiber. These fibers may be fabricated into fabric or a sheet such as woven fabric, nonwoven fabric or the like, or they may be a prepreg obtained by impregnating the fiber with the thermoplastic resin or the thermosetting resin.

In the sandwich structure of the present invention, the thickness of the flat plate is preferably 0.1-2 mm, more preferably 0.2-1 mm, and still more preferably 0.3-0.5 mm. As long as the thickness of the flat plate is within the above-mentioned range, a honeycomb board having excellent workability and good mechanical properties such that external impact can be dispersedly transmitted to the honeycomb core can be obtained.

The sandwich structure of the present invention can be produced by joining the flat plates onto the top and bottom sides of the honeycomb structure of the present invention. Examples of the joining method include, but not particularly limited to, a method that uses an adhesive agent and a heat welding method.

Since the honeycomb structure and the sandwich structure of the present invention is light in weight, excellent in mechanical properties, and also excellent in water resistance and heat resistance, it can favorably be used as structural parts for electric and electronic equipments, automated office equipments, home electric appliances and medical instruments, as automobile parts, aircraft parts, ship parts, parts for building construction or the like.

Examples of the electric and electronic equipments include a display, a FDD carriage, a chassis, HDD, MO, a motor brush holder, a parabolic antenna, a notebook computer, a cell phone, a digital still camera, PDA, a portable MD, a liquid crystal display and a plasma display.

Examples of the automated office equipments and home electric appliances include a telephone, a facsimile, VTR, a copying machine, a television, an iron, a hair dryer, a rice cooker, a microwave oven, an acoustic equipment, a vacuum cleaner, toiletry goods, a laser disk, a compact disk, a lighting equipment, a refrigerator, an air conditioner, a typewriter and a word processor.

Examples of the automobile parts include an undercover, a scuff plate, a pillar trim, a propeller shaft, a drive shaft, a wheel, a wheel cover, a fender, a side mirror, a room mirror, Fesher, a bumper, a bumper beam, a hood, a trunk hood, an aero part, a platform, a cowl louver, a roof, an instrument panel, a spoiler and various modules.

Examples of the aircraft parts include a landing gear pod, a winglet, a spoiler, an edge, a ladder and a fairing.

Examples of the ship parts include a deck, upper structure parts and walls.

Examples of the parts for building construction include a panel, an interior material, an exterior material, a top board, a packaging material and a container.

Among them, the honeycomb structure and the sandwich structure of the present invention are particularly favorably used as structure members for vehicles such as automobiles, aircrafts and ships.

3. Base Material for Honeycomb

The base material for honeycomb of the present invention is a base material for honeycomb made of a thermoplastic resin composition comprising an aromatic polyamide (A) and an aliphatic polyamide (B) for producing the above-described honeycomb structure or sandwich structure, wherein:

the aromatic polyamide (A) is a polyamide including a diamine unit containing 70 mol % or more of a xylylenediamine unit and a dicarboxylic acid unit containing 50 mol % or more of a $C_{4-20}$ linear $\alpha,\omega$-aliphatic dicarboxylic acid unit;

the aliphatic polyamide (B) is a polyamide including aliphatic groups as repetitive units, where the total number of carbons forming the aliphatic groups is 10-24; and the composition ratio of aromatic polyamide (A):aliphatic polyamide (B) is in a range of 100: 25-400 on a mass basis.

The thermoplastic resin composition comprising the aromatic polyamide (A) and the aliphatic polyamide (B), that is used as the base material for honeycomb of the present invention is the same as described for the honeycomb structure of the present invention.

In a preferable aspect of the present invention, simulated fuel CE10 permeability of the thermoplastic resin composition comprising the aromatic polyamide (A) and the aliphatic polyamide (B) for constituting the base material for honeycomb, the honeycomb structure and the sandwich structure is preferably 15 (g·mm/m$^2$·day) or less, more preferably 12 (g·mm/m$^2$·day) or less and still more preferably 10 (g·mm/m$^2$·day) or less. Herein, the simulated fuel CE10 permeability is determined by a method described in the example.

In a preferable aspect of the present invention, the tensile elastic modulus of the thermoplastic resin composition comprising the aromatic polyamide (A) and the aliphatic polyamide (B) for constituting the base material for honeycomb, the honeycomb structure and the sandwich structure is in a range of preferably 500-2500 MPa, more preferably 600-2400 MPa, still more preferably 700-2300 MPa and particularly preferably 750-2200 MPa. If the tensile elastic modulus of the thermoplastic resin composition is within the above-mentioned range, moldability into a honeycomb structure will be good. In addition, due to moderate rigidity, the honeycomb structure or the sandwich structure of the present invention can favorably be utilized as an impact absorb material.

Moreover, the tensile elongation at break of the thermoplastic resin composition for constituting the base material for honeycomb, the honeycomb structure and the sandwich structure is in a range of preferably 10-600%, more preferably 10-550%, still more preferably 15-550% and particularly preferably 20-520%. If the tensile elongation at break of the thermoplastic resin composition is within the above-mentioned range, the toughness of the honeycomb structure or the sandwich structure obtained with the base material for honeycomb will be sufficiently high.

Herein, the tensile elastic modulus and the tensile elongation at break of the thermoplastic resin composition are values determined by measurements according to JIS K7161: 1994 and JIS K7127: 1999, respectively. The detail of the measurement method is described in the example.

In a preferable aspect of the present invention, the deflection temperature under load (load 1.80 MPa) of the thermoplastic resin composition comprising the aromatic polyamide (A) and the aliphatic polyamide (B) for constituting the base material for honeycomb, the honeycomb structure and the sandwich structure is in a range of preferably 40-150° C., more preferably 45-130° C., still more preferably 50-110° C. and particularly preferably 65-100° C. If the deflection temperature under load of the thermoplastic resin composition for constituting the base material for honeycomb, the honeycomb structure and the sandwich structure is within the above-mentioned range, the heat resistance of the honeycomb structure and the sandwich structure will be sufficiently high. Herein, the deflection temperature under load (load 1.80 MPa) of the thermoplastic resin composition for constituting the base material for honeycomb, the honeycomb structure and the sandwich structure is determined by using an ISO test piece according to the I5075-1 and 2 standards. The detail of the measurement method is described in the example.

The method for producing the base material for honeycomb of the present invention is not particularly limited. For example, an aromatic polyamide (A), an aliphatic polyamide (B) and any other component can be dry-blended and fed into an extruder to be molded into a film or a sheet to give a base material for honeycomb.

Alternatively, an aromatic polyamide (A), an aliphatic polyamide (B) and any other component can be melt kneaded beforehand to give a thermoplastic resin composition, which is then molded into a film or a sheet to obtain a base material for honeycomb of the present invention.

The method for molding a thermoplastic resin composition into a film or a sheet is not particularly limited. For example, a known method such as a solution casting method, a melt extrusion method, a calendering method or a compression molding method can be employed. Among these methods, a solution casting method and a melt extrusion method are favorable.

In a solution casting method, a thermoplastic resin composition that has been extruded and kneaded in advance or a homogeneous mixture obtained by dissolving an aromatic polyamide (A), an aliphatic polyamide (B) and any other component in a solvent can be subjected to a step of molding it into a film or a sheet according to a solution casting method or a melt extrusion method.

Examples of the solvent used for the solution casting method include chlorine-based solvents such as chloroform and dichloromethane; aromatic solvents such as toluene, xylene, benzene and mixed solvents thereof; alcohol-based solvents such as methanol, ethanol, isopropanol, n-butanol and 2-butanol; as well as methylcellosolve, ethylcellosolve, butylcellosolve, dimethyl formamide, dimethyl sulfoxide, dioxane, cyclohexanone, tetrahydrofuran, acetone, methyl ethyl ketone (MEK), ethyl acetate and diethylether. These solvents may be used alone or two or more types of them may be used in combination. Examples of the device used for performing the solution casting method include a drum casting machine, a band casting machine and a spin coater.

Examples of the melt extrusion method include a T-die method and an inflation method. The temperature for molding the film upon melt extrusion is preferably 150° C. to 350° C., and more preferably 200° C. to 300° C. When a T-die method is employed to mold a film, a T-die is attached to a tip of a known single- or twin-screw extruder so as to wind up the extruded film to obtain a roll of film. In this case, the temperature of the winding-up roll can suitably be adjusted to stretch the film in the extruding direction, thereby performing an uniaxial stretching step. Alternatively, a step of stretching the film in a direction vertical to the extruding direction can be added so as to perform a sequential biaxial stretching or a simultaneous biaxial stretching step. Here, the base material for honeycomb of the present invention may be an unstretched film or a stretched film. In a case of a stretched film, it may be an uniaxially stretched film or a biaxially stretched film. In a case of a biaxially stretched film, it may be biaxially stretched either simultaneously or sequentially. If the film is biaxially stretched, the mechanical strength as well as the film performance can be enhanced.

The thickness of the base material for honeycomb (film or sheet) is preferably 0.05-2 mm, more preferably 0.1-1 mm, still more preferably 0.1-0.5 mm, and particularly preferably 0.1-0.3 mm. The thickness of the base material for honeycomb may appropriately be determined according to the usage or the like of the base material for honeycomb.

Since the base material for honeycomb of the present invention is made of a thermoplastic resin composition that can be plastically deformed and heat welded, it can be molded into a desired shape by a simple method. Moreover, since the base material for honeycomb of the present invention is made of a thermoplastic resin composition comprising an aromatic polyamide (A) and an aliphatic polyamide (B), at least a part of the thermoplastic resin composition can be stretched upon shaping into a honeycomb structure or a sandwich structure so that the mechanical properties and the gas barrier property of the resulting honeycomb structure or sandwich structure can further be enhanced.

EXAMPLES

Hereinafter, the present invention will be described in more detail by means of examples. The present invention, however, should not be limited to these examples. Herein, various evaluations in the examples and else were carried out according to the following methods.

(1) Tensile Elastic Modulus and Tensile Elongation at Break

Evaluations were conducted according to JIS K-7161: 1994 and K-7127: 1999. The base material for honeycomb in a form of a film with a thickness of 300 μm produced in each of Examples and Comparative examples was cut into 10 mm×100 mm to be used as a test piece. A strograph manufactured by Toyo Seiki Seisaku-sho was used to perform a tensile test under the following conditions to determine the tensile elastic modulus and the tensile elongation at break: measurement temperature of 23° C., humidity of 50% RH, distance between the chucks of 50 mm and pulling speed of 50 mm/min.

(2) Water Resistance

The base material for honeycomb in a form of a film with a thickness of 100 μm produced in each of Examples and Comparative examples was cut into 10 mm×100 mm to be used as a test piece. The test piece was immersed in water, left to stand at 23° C. for a month and then the tensile elastic modulus was measured according to JIS K-7161: 1994 and JIS K-7127: 1999. The resulting elastic modulus retention rate was evaluated based on the following criteria. Here, the elastic modulus retention rate was calculated by Formula [(Elastic modulus after water immersion/Elastic modulus before water immersion)×100 (%)].

<Evaluation Criteria>
AA: Elastic modulus retention rate of 85% or higher
A: Elastic modulus retention rate of 75% or higher
C: Elastic modulus retention rate less than 75%

(3) Gas Barrier Property (simulated Fuel CE10 Permeability)

15 ml of CE10 (isooctane:toluene:ethanol=45:45:10 vol %) was placed into an aluminum cup having a permeating cross-sectional area of 11.34 cm$^2$; the opening was sealed with a film of the base material for honeycomb having a thickness of 100 μm made of the thermoplastic resin composition produced in each of Examples and Comparative examples; and the cup was left to stand under an atmosphere of 40° C. The change in the weight of the cup 300 hours after the sealing was measured.

(4) Melting Point Tm (° C.)

The melting point was measured by differential scanning calorimetry. The differential scanning calories were measured according to JIS K7121: 1987, JIS K7122: 1987. The measurement was conducted as follows by using a differential scanning calorimeter (manufactured by Shimadzu Corporation, trade name: "DSC-60").

5 mg of a thermoplastic resin composition was fed into a DSC measurement pan to conduct the measurement after a pretreatment of increasing the temperature to [melting point of aromatic polyamide (A)+35° C.] at a temperature raising rate of 10° C./min under a nitrogen atmosphere followed by rapid cooling to 0° C. at a temperature lowering rate of −100° C./sec by bringing into contact with dry ice. The measurement was conducted under the conditions where the temperature was increased to [melting point of aromatic polyamide (A)+35° C.] at a temperature raising rate of 10° C./min and maintained at that temperature for 5 minutes, and then the temperature was lowered to 100° C. at a temperature lowering rate of −5° C./min, thereby determining the melting point Tm (° C.) of the thermoplastic resin composition as the peak top temperature of the endothermic peak.

(5) Vacuum Moldability

Using an air pressure vacuum molding machine manufactured by Asano Laboratories Co., Ltd., the base material for honeycomb in a form of a film with a thickness of 300 μm obtained in each of Examples and Comparative examples was heated with an IR heater until the surface was softened, and then it was subjected to vacuum molding using said molding machine to plastically deform it into a half part of the hexagonal column shown in FIG. 2. As to the cells formed by folding the half parts of the resulting hexagonal columns, the thickness of the cell sidewalls of was 0.3 mm, the cell size was 9 mm, and the height (the length of the longer sides of the cell sidewalls) was 15 mm. Due to this plastic deformation, the faces constituting the cross-sections of the half parts of the hexagonal columns, i.e., the trapezoidal legs, and the connection regions 5a and 5b are stretched in the direction indicated by the arrows in FIG. 3 (direction horizontal to the connection regions 5a and 5b constituting the surface layer of the honeycomb structure). The appearance of the resulting deformed film was visually evaluated based on the evaluation criteria below in which an object that was plastically deformed as intended with no hole, crack or wrinkle was evaluated as A, an object that was plastically deformed as intended but with a partial unevenness such as a hole, crack or wrinkle was evaluated as B, and an object that was not plastically deformed as intended was evaluated as C.

<Evaluation Criteria>
A: Molded without any problem
B: Molded, but with some unevenness
C: Unable to mold (6) Welding Property A deformed film having a row of the half parts of the hexagonal columns obtained in (5) above was folded as shown in FIGS. 4 and 5 to form a honeycomb structure, which was heated from above and below at 150° C. with a heat press machine to weld the adjacent cell sidewalls and fix the honeycomb structure. Based on the following evaluation criteria, an object that could be folded without any problem and that was welded enough to fix the honeycomb structure by heating was evaluated as A, an object that could be folded and welded but that resulted a crack upon folding or resulted unevenness due to slight plastic deformation upon heating was evaluated as B, and an object that was broken upon folding or that was plastically deformed greatly upon heating was evaluated as C.

<Evaluation Results>
A: Welded without any problem
B: Welded, but with some unevenness
C: Unable to be welded
(7) Deflection Temperature Under Load Mixed pellets obtained by dry-blending pellets of the aromatic polyamide (A) and the aliphatic polyamide (B) produced in each of Examples and Comparative examples were at the composition ratios indicated in Table 1 were dried at 120° C. for 5 hours. The dried mixed pellets was made into ISO test pieces for measuring the deflection temperature under load, with an injection molding machine (manufactured by Japan Steel Works "J150E-P-2M") under the conditions of a cylinder temperature of 250-270° C., a mold temperature of 80° C., a screw rotation speed of 80 rpm and a back pressure of 0.6 MPa.

The prepared ISO test pieces were used to measure the deflection temperature under load under the conditions according to ISO75-1 and 2 at a load of 1.80 MPa (Method A). The apparatus used was Automatic Heat Deflection Tester (Type: 3A-2) manufactured by Toyo Seiki Seisaku-Sho.

Production Example 1

Production of Aromatic Polyamide (A1) (MXD6)

15000 g (102.6 mol) of adipic acid, 17.3 g (0.16 mol) of sodium hypophosphite and 12.1 g (0.15 mol) of sodium acetate were fed into an SUS reaction tank having a heating jacket, that had an inner capacity of 50 liters and that was provided with a partial condenser, a total condenser, a pressure gauge, a nitrogen inlet port, a liquid inlet port, a resin-extracting valve and an agitator. The atmosphere inside the reaction tank was replaced with nitrogen. Next, the reaction tank was heated to 170° C. under normal pressure while allowing nitrogen to flow at a rate of 10 ml/min to completely melt the adipic acid. Then, 13980 g (102.6 mol) of meta-xylylenediamine was allowed to drop. During meta-xylylenediamine dropping, water generated by polycondensation was removed from the system and the temperature was continuously increased so that the reaction system was not solidified. The whole amount of meta-xylylenediamine was dropped by spending 100 minutes and the temperature inside the reaction tank was increased to 250° C. Then, the inner temperature was increased to 260° C. by spending 10 minutes while maintaining normal pressure. The inner temperature was maintained at 260° C. while the pressure inside the reaction tank was reduced to 600 mmHg by spending 10 minutes using an aspirator and a pressure regulator, and polycondensation reaction was continued at 600 mmHg. The torque of the agitator was observed so that once the viscosity of the resin became sufficiently high, agitation was stopped and the pressure inside the reaction tank was increased to 0.2 MPa with nitrogen. Then, the resin-extracting valve at the bottom of the reaction tank was opened to take out the polymer in a strand form, which was cooled with water and pelletized with a pelletizer, thereby obtaining about 25 kg of pellets of a meta-xylene group-containing polyamide (MXD6).

Subsequently, the pellets of the meta-xylene group-containing polyamide were fed into a jacketed tumble dryer that was provided with a nitrogen gas feed pipe, a vacuum line, a vacuum pump and a thermocouple for measuring the inner temperature, which was rotated at a constant rate while the atmosphere inside the tumble dryer was sufficiently replaced with nitrogen gas with a purity of 99 vol % or higher. Thereafter, the tumble dryer was heated under the same nitrogen gas stream to increase the pellet temperature to 150° C. by spending about 150 minutes. Once the pellet temperature reached 150° C., the pressure inside the system was reduced to 1 torr or less. The pellet temperature was further increased to 200° C. by spending about 70 minutes, and maintained at 200° C. for 70 minutes. Then, nitrogen gas with a purity of 99 vol % or higher was introduced into the system and the tumble dryer was cooled while rotating, thereby obtaining an aromatic polyamide (A1).

The relative viscosity of the resulting aromatic polyamide (A1) (MXD6) was 3.5. Moreover, the quantity of a component having a number-average molecular weight of 1000 or lower was 1.1% by mass as measured by GPC. In addition, the melting point (Tm) of the aromatic polyamide (A1) was 239° C. as measured by DSC method.

Production Example 2

Production of Aromatic Polyamide (A2) (MXD10)

12135 g (60 mol) of accurately weighed sebacic acid, 3.105 g of a sodium hypophosphite monohydrate ($NaH_2PO_2/H_2O$) (50 ppm in terms of phosphorus atom concentration in the polyamide resin) and 1.61 g of sodium acetate were placed into a reaction vessel that was provided with an agitator, a partial condenser, a total condenser, a thermometer, a dropping funnel, a nitrogen feed pipe and a strand die. After an adequate nitrogen replacement, the reaction vessel was filled with nitrogen until an internal pressure of 0.4 MPa was obtained, and heated to 170° C. while agitating inside the system under a small amount of nitrogen stream. The molar ratio of sodium hypophosphite monohydrate/sodium acetate was 0.67.

To this, 8335 g (61 mol) of meta-xylylenediamine was dropped, and the temperature inside the system was increased continuously while removing the generated condensation water from the system. After dropping the mixed xylylenediamine, melt polymerization reaction was continued at an inner temperature of 260° C. for 20 minutes. Subsequently, the internal pressure was returned to atmospheric pressure at a rate of 0.01 MPa/min.

Thereafter, the pressure inside the system was again increased with nitrogen to take out the polymer from the strand die, which was pelletized to obtain about 24 kg of an aromatic polyamide (A2) (MXD10). The resulting pellets were dried with dehumidifying air (dew point: −40° C.) at 80° C. for an hour.

The relative viscosity of the aromatic polyamide (A2) was 2.1. Moreover, the quantity of a component having a number-average molecular weight of 1000 or lower was 2% by mass as measured by GPC. In addition, the melting point (Tm) of the aromatic polyamide (A2) was 190° C. as measured by DSC method.

Production Example 3

Production of Aromatic Polyamide (A3) (MPXD10)

12135 g (60 mol) of accurately weighed sebacic acid, 3.105 g of a sodium hypophosphite monohydrate ($NaH_2PO_2/H_2O$) (50 ppm in terms of phosphorus atom concentration in the polyamide resin) and 1.61 g of sodium acetate were placed into a reaction vessel that was provided with an agitator, a partial condenser, a total condenser, a thermometer, a dropping funnel, a nitrogen feed pipe and a strand die. After an adequate nitrogen replacement, the reaction vessel was filled with nitrogen until an internal pressure of 0.4 MPa was obtained, and heated to 170° C. while agitating inside the system under a small amount of nitrogen stream. The molar ratio of sodium hypophosphite monohydrate/sodium acetate was 0.67.

To this, 8,335 g (61 mol) of a mixed diamine of meta-xylylenediamine and para-xylylenediamine at 7:3 (molar ratio) was dropped while agitating, and the temperature inside the system was increased continuously while removing the generated condensation water from the system. After dropping the mixed xylylenediamine, melt polymerization reaction was continued at an inner temperature of 260° C. for 20 minutes. Subsequently, the internal pressure was returned to atmospheric pressure at a rate of 0.01 MPa/min.

Thereafter, the pressure inside the system was again increased with nitrogen to take out the polymer from the strand die, which was pelletized to obtain about 24 kg of an aromatic polyamide (A3) (MPXD10). The resulting pellets were dried with dehumidifying air (dew point: −40° C.) at 80° C. for an hour.

The relative viscosity of the aromatic polyamide (A3) was 2.1. Moreover, the quantity of a component having a number-average molecular weight of 1000 or lower was 2% by mass as measured by GPC. In addition, the melting point (Tm) of the aromatic polyamide (A3) was 213° C. as measured by DSC method.

Production Example 4

Production of Aromatic Polyamide (A4) (MXD6I)

14100 g (96.4 mol) of adipic acid, 1023 g (6.16 mol) of isophthalic acid, 17.3 g (0.16 mol) of sodium hypophosphite and 12.1 g (0.15 mol) of sodium acetate were fed into an SUS reaction tank having a heating jacket, that had an inner capacity of 50 liters and that was provided with a partial condenser, a total condenser, a pressure gauge, a nitrogen inlet port, a liquid inlet port, a resin-extracting valve and an agitator. The atmosphere inside the reaction tank was replaced with nitrogen. Next, the reaction tank was heated to 170° C. under normal pressure while allowing nitrogen to flow at a rate of 10 ml/min to completely melt the adipic acid. Then, 13980 g (102.6 mol) of meta-xylylenediamine was allowed to drop. During meta-xylylenediamine dropping, water generated by polycondensation was removed from the system and the temperature was continuously increased so that the reaction system was not solidified. The whole amount of meta-xylylenediamine was dropped by spending 100 minutes and the temperature inside the reaction tank was increased to 250° C. Then, the inner temperature was increased to 260° C. by spending 10 minutes while maintaining normal pressure. The inner temperature was maintained at 260° C. while the pressure inside the reaction tank was reduced to 600 mmHg using an aspirator and a pressure regulator by spending 10 minutes, and polycondensation reaction was continued at 600 mmHg. The torque of the agitator was observed so that once the viscosity of the resin became sufficiently high, agitation was stopped and the pressure inside the reaction tank was increased to 0.2 MPa with nitrogen. Then, the resin-extracting valve at the bottom of the reaction tank was opened to take out the polymer in a strand form, which was cooled with water and pelletized with a pelletizer, thereby obtaining about 25 kg of pellets of a meta-xylylene group-containing polyamide (MXD6I).

Subsequently, the pellets of the meta-xylylene group-containing polyamide were fed into a jacketed tumble dryer that was provided with a nitrogen gas feed pipe, a vacuum line, a vacuum pump and a thermocouple for measuring the inner temperature, which was rotated at a constant rate while the atmosphere inside the tumble dryer was sufficiently replaced with nitrogen gas with a purity of 99 vol % or higher. Thereafter, the tumble dryer was heated under the same nitrogen gas stream to increase the pellet temperature to 150° C. by spending about 150 minutes. Once the pellet temperature reached 150° C., the pressure inside the system was reduced to 1 torr or less. The pellet temperature was further increased to 200° C. by spending about 70 minutes, and maintained at 200° C. for 70 minutes. Then, nitrogen gas with a purity of 99 vol % or higher was introduced into the system and the tumble dryer was cooled while rotating, thereby obtaining an aromatic polyamide (A4).

The relative viscosity of the resulting aromatic polyamide (A4) (MXD6I) was 2.65. Moreover, the quantity of a component having a number-average molecular weight of 1000 or lower was 1.0% by mass as measured by GPC. In addition, the melting point (Tm) of the aromatic polyamide (A4) was 228° C. as measured by DSC method.

Examples 1-4

The pellets of the aromatic polyamide (A1) (MXD6) obtained in Production example 1 and polyamide 11 (manufactured by Arkema, Rilsan (trademark) BMN O TLD) were mixed at the composition ratios indicated in Table 1, and fed into a T-die single-screw extruder with a cylinder diameter of 30 mm (PTM-30, manufactured by Research Laboratory of Plastics Technology Co., Ltd.). The resultant was melt kneaded under the following conditions: a cylinder temperature of 215° C.-280° C. and a screw rotation speed of 30 rpm. Following melt kneading, a film-shaped object was extruded via the T-die and solidified on a cooling roll, thereby obtaining films of the base materials for honeycomb with thicknesses of 300 μm and 100 μm. The resulting base materials for honeycomb were used to evaluate the vacuum moldability and the welding property.

Examples 5 and 6

Base materials for honeycomb were molded into films in the same manner as Examples 1-4 except that pellets of the aromatic polyamide (A2) (MXD10) obtained in Production example 2 were used instead of the aromatic polyamide (A1) (MXD6) at the composition ratios indicated in Table 1, to evaluate the vacuum moldability and the welding properties thereof.

Example 7

A base material for honeycomb was molded into a film in the same manner as Examples 1-4 except that pellets of the aromatic polyamide (A3) (MPXD10) obtained in Production example 3 were used instead of the aromatic polyamide (A1) (MXD6) at the composition ratio indicated in Table 1, to evaluate the vacuum moldability and the welding property thereof.

Example 8

A base material for honeycomb was molded into a film in the same manner as Examples 1-4 except that pellets of the aromatic polyamide (A4) (MXD6I) obtained in Production example 4 were used instead of the aromatic polyamide (A1) (MXD6) at the composition ratio indicated in Table 1, to evaluate the vacuum moldability and the welding property thereof.

Comparative Example 1

A base material for honeycomb was molded into a film in the same manner as Examples 1-4 except that pellets of the aromatic polyamide (A1) (MXD6) obtained in Production example 1 were used alone, to evaluate the vacuum moldability and the welding property thereof.

Comparative Example 2

A base material for honeycomb was molded into a film in the same manner as Examples 1-4 except that pellets of polyamide 11 (manufactured by Arkema, Rilsan (trademark) BESN P20 TL) were used alone, to evaluate the vacuum moldability and the welding property thereof.

Comparative Examples 3 and 4

Base materials for honeycomb were molded into films in the same manner as Examples 1-4 except that pellets of the aromatic polyamide (A1) (MXD6) obtained in Production example 1 and polyamide 11 (manufactured by Arkema, Rilsan (trademark) BESN P20 TL) were used at the composition ratios indicated in Table 2, to evaluate the vacuum moldability and the welding properties thereof.

Comparative Example 5

A base material for honeycomb was molded into a film in the same manner as Examples 1-4 except that pellets of polyamide 6 (manufactured by Ube Industries, nylon 6, "UBE nylon" 1022B) were used instead of the aromatic polyamide (A1) (MXD6) obtained in Production example 1 at the composition ratio indicated in Table 2, to evaluate the vacuum moldability and the welding property thereof.

Comparative Example 6

Base materials for honeycomb were molded into films in the same manner as Examples 1-4 except that polyamide 6 (manufactured by Ube Industries, nylon 6, "UBE nylon" 1022B) and modified polyolefin (Bondfast BF-7L: manufactured by Sumitomo Chemical Co., Ltd., a glycidyl methacrylate-modified polyethylene copolymer, melt flow rate MFR 7 g/10 min, density 0.96) were used at the composition ratio of polyamide 6:modified polyolefin=100:43, to evaluate the vacuum moldability and the welding properties thereof.

The results from Examples 1-8 as well as the results from Comparative examples 1-6 are shown in Table 1 and 2, respectively.

TABLE 1

|  | Example 1 | Example 2 | Example 3 | Example 4 | Example 5 | Example 6 | Example 7 | Example 8 |
|---|---|---|---|---|---|---|---|---|
| Aromatic polyamide (A) | MXD6 | MXD6 | MXD6 | MXD6 | MXD10 | MXD10 | MPXD10 | MXD6I |
| Aliphatic polyamide (B) | N11 | N11 | N11 | N11 | N11 | N11 | N11 | N11 |
| (A)/(B) composition ratio | 100/25 | 100/66.7 | 100/150 | 100/400 | 100/66.7 | 100/150 | 100/66.7 | 100/66.7 |
| Tensile elastic modulus (MPa) | 2171 | 1611 | 1240 | 630 | 1025 | 831 | 1283 | 1596 |
| Tensile elongation at break (%) | 23 | 80 | 419 | 479 | 94 | 421 | 91 | 78 |
| Water resistance | A | A | A | A | AA | AA | AA | A |
| CE10 permeability (g · mm/m$^2$ · day) | 0.5 | 2.6 | 4 | 10.3 | 8.7 | 11.1 | 8.1 | 2.7 |
| Melting point (° C.) | 184, 234 | 184, 234 | 184, 234 | 184, 234 | 184, 190 | 184, 190 | 184, 213 | 184, 228 |
| Vacuum moldability | A | A | A | A | A | A | A | A |
| Welding property | A | A | A | A | A | A | A | A |
| Deflection temperature under load(° C.) | 91 | 85 | 65 | 58 | 66 | 58 | 67 | 92 |

TABLE 2

|  | Comparative example 1 | Comparative example 2 | Comparative example 3 | Comparative example 4 | Comparative example 5 | Comparative example 6 |
|---|---|---|---|---|---|---|
| Aromatic polyamide (A) | MXD6 | N11 | MXD6 | MXD6 | N6 | N6 |
| Aliphatic polyamide (B) | — | — | N11 | N11 | N11 | Modified PO |
| (A)/(B) composition ratio |  |  | 100/11.1 | 100/500 | 100/66.7 | 100/43 |
| Tensile elastic modulus (MPa) | 3300 | 310 | 2713 | 811 | 998 | 520 |
| Tensile elongation at break (%) | 3 | 477 | 11 | 477 | 382 | 571 |
| Water resistance | A | AA | A | A | C | C |
| CE10 permeability (g · mm/m$^2$ · day) | 0.12 | 16.5 | 5 | 13.9 | 17.7 | 15.3 |
| Melting point (° C.) | 234 | 184 | 184, 234 | 184, 234 | 184, 225 | 220 |
| Vacuum moldability | C | A | A | A | A | A |
| Welding property | — | C | C | C | A | A |
| Deflection temperature under load(° C.) | 93 | 56 | 93 | 57 | 66 | 61 |

As can be appreciated from Table 1, the base materials for honeycomb of the present invention prepared using the thermoplastic resin composition containing the aromatic polyamide (A) and the aliphatic polyamide (B) at a predetermined composition ratio had high gas barrier property, moderate balance of rigidity and toughness, and excellent water resistance and heat resistance. The base material for honeycomb of the present invention is also excellent in terms of vacuum moldability and welding property. These results suggest that the base material for honeycomb of the present invention could be used for continuously molding a honeycomb structure and sandwich structure that have excellent gas barrier property, mechanical properties, water resistance and heat resistance. In particular, the honeycomb structure and the sandwich structure of the present invention desirably have a high deflection temperature under load, high gas barrier property and high tensile elastic modulus, and are required to have a high deflection temperature under load when they are used for vehicles and transportation containers that are exposed to a high temperature. In this respect, the base material for honeycomb obtained in Example 1 could be the best material for the usage involving exposure to a high temperature since it has a high deflection temperature under load and excellent gas barrier property and tensile elastic modulus.

On the other hand, when the base material for honeycomb was produced only with the aromatic polyamide (A) as indicated in Table 2, the rigidity was too high that it could not be folded and thus unable to achieve vacuum moldability and welding property (Comparative example 1). When the base material for honeycomb was produced only with the aliphatic polyamide (B), it buckled upon welding and thus was inferior in molding workability (Comparative example 2).

Even when the thermoplastic resin compositions comprising the aromatic polyamide (A) and the aliphatic polyamide (B) were used, welding was not realized when the composition ratio of the aliphatic polyamide (B) was too low (Comparative example 3) whereas buckling occurred upon welding when the composition ratio of the aliphatic polyamide was too high (Comparative example 4), and thus being unable to earn molding workability.

When polyamide 6 instead of the aromatic polyamide (A) was used in combination with the aliphatic polyamide (B), water resistance was not achieved, which limits the usage of the honeycomb structure and the sandwich structure (Comparative example 5).

When polyamide 6 was used instead of the aromatic polyamide (A) and the modified polyolefin instead of the aliphatic polyamide (B), water resistance was not achieved and gas barrier property was insufficient (Comparative example 6).

The honeycomb structure and the sandwich structure of the present invention can favorably be used as a structural part for an electric and electronic equipment, an automated office equipment, home electric appliances and a medical instrument, as an automobile part, as an aircraft part, as a ship part and as a part for building construction. By using the base material for honeycomb of the present invention, a honeycomb structure and a sandwich structure having excellent gas barrier property, toughness, rigidity, water resistance and heat resistance can be produced by a simple method.

REFERENCE SIGNS LIST 1a, 1b Cell
2 Cell sidewall
3a Surface layer (top member)
3b Surface layer (bottom member)
4a Three-dimensional structure
4b Three-dimensional structure
5a Connection region
5b Connection region
6 Axis
7 Axis
8 Guiding grid
9a Folding guide
9b Folding guide
10 Feed roll
11 Draw-in roll
12 Honeycomb structure part
100 Honeycomb structure

The invention claimed is:

1. A honeycomb structure comprising a thermoplastic resin composition consisting of an aromatic polyamide (A) and an aliphatic polyamide (B), wherein:
  the aromatic polyamide (A) is a polyamide including a diamine unit containing 70 mol % or more of a xylylenediamine unit and a dicarboxylic acid unit containing 50 mol % or more of a $C_{4-20}$ linear α,ω-aliphatic dicarboxylic acid unit;
  the aliphatic polyamide (B) is a polyamide including aliphatic groups as repetitive units, where the total number of carbons forming the aliphatic groups is 10-24; and
  the composition ratio of aromatic polyamide (A):aliphatic polyamide (B) is in a range of 100:25-400 on a mass basis.

2. The honeycomb structure according to claim 1, wherein the xylylenediamine unit of the aromatic polyamide (A) is derived from meta-xylylenediamine, para-xylylenediamine or a mixture thereof, and the $C_{4-20}$ linear α,ω-aliphatic dicarboxylic acid unit is derived from adipic acid, sebacic acid or a mixture thereof.

3. The honeycomb structure according to claim 1, wherein the aliphatic polyamide (B) is one or more types selected from the group consisting of polyamide 11, polyamide 12, polyamide 6,6, polyamide 6,10, polyamide 6,12 and polyamide 10,10.

4. The honeycomb structure according to claim 1, wherein the simulated fuel CE10 permeability of the thermoplastic resin composition forming the honeycomb structure is 15 (g·mm/m²·day) or less.

5. The honeycomb structure according to claim 1, wherein the tensile elastic modulus of the thermoplastic resin composition forming the honeycomb structure is in a range of 500-2500 MPa.

6. The honeycomb structure according to claim 1, wherein the deflection temperature under load (load 1.80 MPa) of the thermoplastic resin composition forming the honeycomb structure is in a range of 40-150° C.

7. The honeycomb structure according to claim 1 which is formed of a plurality of cells, wherein:
  each of the cells is defined by a hexagonal surface layer that continuously or intermittently joins the cells together at either top or bottom side, and has cell sidewalls that annularly adjoin each other;
  the hexagonal surface layer and the cell sidewalls are perpendicular to each other; and
  the honeycomb structure is formed by folding, substantially without cutting, a honeycomb structure part that is obtained through plastic deformation of the base material for honeycomb and that has a three-dimensional structure and a connection region that becomes the hexagonal surface layer after folding.

8. The honeycomb structure according to claim 7, wherein the cell sidewalls and the surface layer are partially stretched in a direction horizontal to the surface layer.

9. The honeycomb structure according to claim 7, wherein at least some of the cell sidewalls are completely or partially joined together.

10. A sandwich structure obtained by disposing flat plates made of the same material as the material making the honeycomb structure on the top and bottom sides of the honeycomb structure according to claim 1.

11. A sandwich structure obtained by disposing flat plates made of a material different from the material making the honeycomb structure on the top and bottom sides of the honeycomb structure according to claim 1.

12. A base material for honeycomb comprising a thermoplastic resin composition consisting of an aromatic polyamide (A) and an aliphatic polyamide (B), for producing the honeycomb structure according to claim 1, wherein:
the aromatic polyamide (A) is a polyamide including a diamine unit containing 70 mol % or more of a xylylenediamine unit and a dicarboxylic acid unit containing 50 mol % or more of a $C_{4-20}$ linear $\alpha,\omega$-aliphatic dicarboxylic acid unit;
the aliphatic polyamide (B) is a polyamide including aliphatic groups as repetitive units, where the total number of carbons forming the aliphatic groups is 10-24; and
the composition ratio of aromatic polyamide (A):aliphatic polyamide (B) is in a range of 100:25-400 on a mass basis.

13. A base material for honeycomb comprising a thermoplastic resin composition consisting of an aromatic polyamide (A) and an aliphatic polyamide (B), for producing the sandwich structure according to claim 10, wherein:
the aromatic polyamide (A) is a polyamide including a diamine unit containing 70 mol % or more of a xylylenediamine unit and a dicarboxylic acid unit containing 50 mol % or more of a $C_{4-20}$ linear $\alpha,\omega$-aliphatic dicarboxylic acid unit;
the aliphatic polyamide (B) is a polyamide including aliphatic groups as repetitive units, where the total number of carbons forming the aliphatic groups is 10-24; and
the composition ratio of aromatic polyamide (A):aliphatic polyamide (B) is in a range of 100:25-400 on a mass basis.

14. A base material for honeycomb comprising a thermoplastic resin composition consisting of an aromatic polyamide (A) and an aliphatic polyamide (B), for producing the sandwich structure according to claim 11, wherein:
the aromatic polyamide (A) is a polyamide including a diamine unit containing 70 mol % or more of a xylylenediamine unit and a dicarboxylic acid unit containing 50 mol % or more of a $C_{4-20}$ linear $\alpha,\omega$-aliphatic dicarboxylic acid unit;
the aliphatic polyamide (B) is a polyamide including aliphatic groups as repetitive units, where the total number of carbons forming the aliphatic groups is 10-24; and
the composition ratio of aromatic polyamide (A):aliphatic polyamide (B) is in a range of 100:25-400 on a mass basis.

* * * * *